US011996061B2

(12) United States Patent
Bansho et al.

(10) Patent No.: US 11,996,061 B2
(45) Date of Patent: May 28, 2024

(54) DRIVER, ELECTRO-OPTICAL DEVICE, AND ELECTRONIC APPARATUS

(71) Applicant: SEIKO EPSON CORPORATION, Tokyo (JP)

(72) Inventors: Ryota Bansho, Matsumoto (JP); Akira Morita, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/190,994

(22) Filed: Mar. 28, 2023

(65) Prior Publication Data

US 2023/0306923 A1 Sep. 28, 2023

(30) Foreign Application Priority Data

Mar. 28, 2022 (JP) ................................ 2022-051175

(51) Int. Cl.
*G09G 3/36* (2006.01)

(52) U.S. Cl.
CPC ... *G09G 3/3674* (2013.01); *G09G 2310/0248* (2013.01); *G09G 2310/027* (2013.01); *G09G 2310/08* (2013.01)

(58) Field of Classification Search
CPC ... G09G 3/3674; G09G 3/3696; G09G 3/2092
See application file for complete search history.

(56) References Cited

U.S. PATENT DOCUMENTS

| | | | | |
|---|---|---|---|---|
| 2001/0015711 A1* | 8/2001 | Aoki | .................... | G09G 3/3611 345/92 |
| 2016/0111035 A1 | 4/2016 | Morita | | |
| 2016/0111038 A1 | 4/2016 | Morita | | |
| 2016/0217758 A1 | 7/2016 | Morita | | |

FOREIGN PATENT DOCUMENTS

| | | |
|---|---|---|
| JP | 2016-080805 | 5/2016 |
| JP | 2016-080807 | 5/2016 |
| JP | 2016-138956 | 8/2016 |
| JP | 2020-034589 | 3/2020 |

* cited by examiner

*Primary Examiner* — Sardis F Azongha
(74) *Attorney, Agent, or Firm* — JCIPRNET

(57) ABSTRACT

A driver includes a data voltage output terminal, a capacitor drive circuit that outputs each of first to n-th capacitor drive voltages corresponding to gradation data to a respective one of first to n-th capacitor driving nodes, a capacitor circuit including first to n-th capacitors each provided between an output node and a respective one of the first to n-th capacitor driving nodes, a processing circuit that generates a correction signal for correcting a voltage difference between an output voltage and a target voltage corresponding to the gradation data, and a correction circuit that corrects the voltage difference with a correction voltage corresponding to the voltage difference by injecting a charge corresponding to the correction signal into the output node or discharging the charge from the output node by using the correction capacitor circuit.

16 Claims, 20 Drawing Sheets

| CORRECTION TARGET | TARGET FOR SETTING GRADATION VALUE AND DRIVING |
|---|---|
| VOLTAGE DIFFERENCE CAUSED BY TIME CONSTANT OF CAPACITIVE DRIVING | TARGET SIGNAL SUPPLY LINE |
| VOLTAGE DIFFERENCE CAUSED BY ERROR IN CAPACITANCE RATIO OF CAPACITIVE DRIVING | ALL SIGNAL SUPPLY LINES |
| VOLTAGE DIFFERENCE CAUSED BY COUPLING BETWEEN SIGNAL SUPPLY LINES | TARGET SIGNAL SUPPLY LINE AND ADJACENT SIGNAL SUPPLY LINE |

FIG. 24

DRIVER, ELECTRO-OPTICAL DEVICE, AND ELECTRONIC APPARATUS

The present application is based on, and claims priority from JP Application Serial Number 2022-051175, filed Mar. 28, 2022, the disclosure of which is hereby incorporated by reference herein in its entirety.

BACKGROUND

1. Technical Field

The present disclosure relates to a driver, an electro-optical device, and an electronic apparatus.

2. Related Art

For example, JP-A-2016-138956 discloses a driver including a plurality of data-line drive circuits and a correction circuit. The correction circuit supplies display data processed for correction with a correction coefficient based on a coupling capacitance between a data line and another data line adjacent to the aforementioned data line to a data-line drive circuit for driving the data lines. The data-line drive circuit drives the data lines by capacitive driving using a capacitor and a drive circuit that drives the capacitor.

As a target voltage desired to be output in the capacitive driving gets closer to the power supply voltage, the charge supply capability by the capacitive driving decreases due to the internal resistance of the drive circuit. For this reason, there is a problem that it takes time for the voltage of the signal supply lines to reach the target voltage. For example, when an amplifier circuit is used together therewith, there is a possibility of the difference between the voltage of the signal supply lines and the target voltage increasing at the timing at which amplifier driving is started. Then, the amplifier circuit needs to respond to the difference quickly and a large amount of current needs to flow.

SUMMARY

An aspect of the present disclosure relates to a driver including a data voltage output terminal electrically coupled to a signal supply line of an electro-optical panel, a capacitor drive circuit configured to output each of first to n-th capacitor drive voltages corresponding to gradation data to a respective one of first to n-th capacitor driving nodes, n being an integer of two or more, a capacitor circuit including first to n-th capacitors each provided between an output node and a respective one of the first to n-th capacitor driving nodes, the output node being a node of the data voltage output terminal, a processing circuit configured to generate a correction signal for correcting a voltage difference between an output voltage of the output node and a target voltage corresponding to the gradation data, and a correction circuit including a correction capacitor circuit and configured to correct the voltage difference with a correction voltage corresponding to the voltage difference by injecting a charge corresponding to the correction signal into the output node or discharging the charge from the output node by using the correction capacitor circuit.

In addition, another aspect of the present disclosure relates to an electro-optical device including the driver and the electro-optical panel.

In addition, another aspect of the present disclosure relates to an electronic apparatus including the driver.

BRIEF DESCRIPTION OF THE DRAWINGS

FIG. 24 illustrates an explanatory diagram of a method for determining a set value of a correction voltage for each factor of a voltage difference between an output voltage and a target voltage.

DESCRIPTION OF EXEMPLARY EMBODIMENTS

Exemplary embodiments of the present disclosure will be described in detail hereinafter. Further, the embodiments described hereinafter are not intended to unjustly limit the content described in the claims, and all of the configurations described in the embodiments are not necessarily essential configuration requirements.

1. Electro-Optical Device

Figure 1:
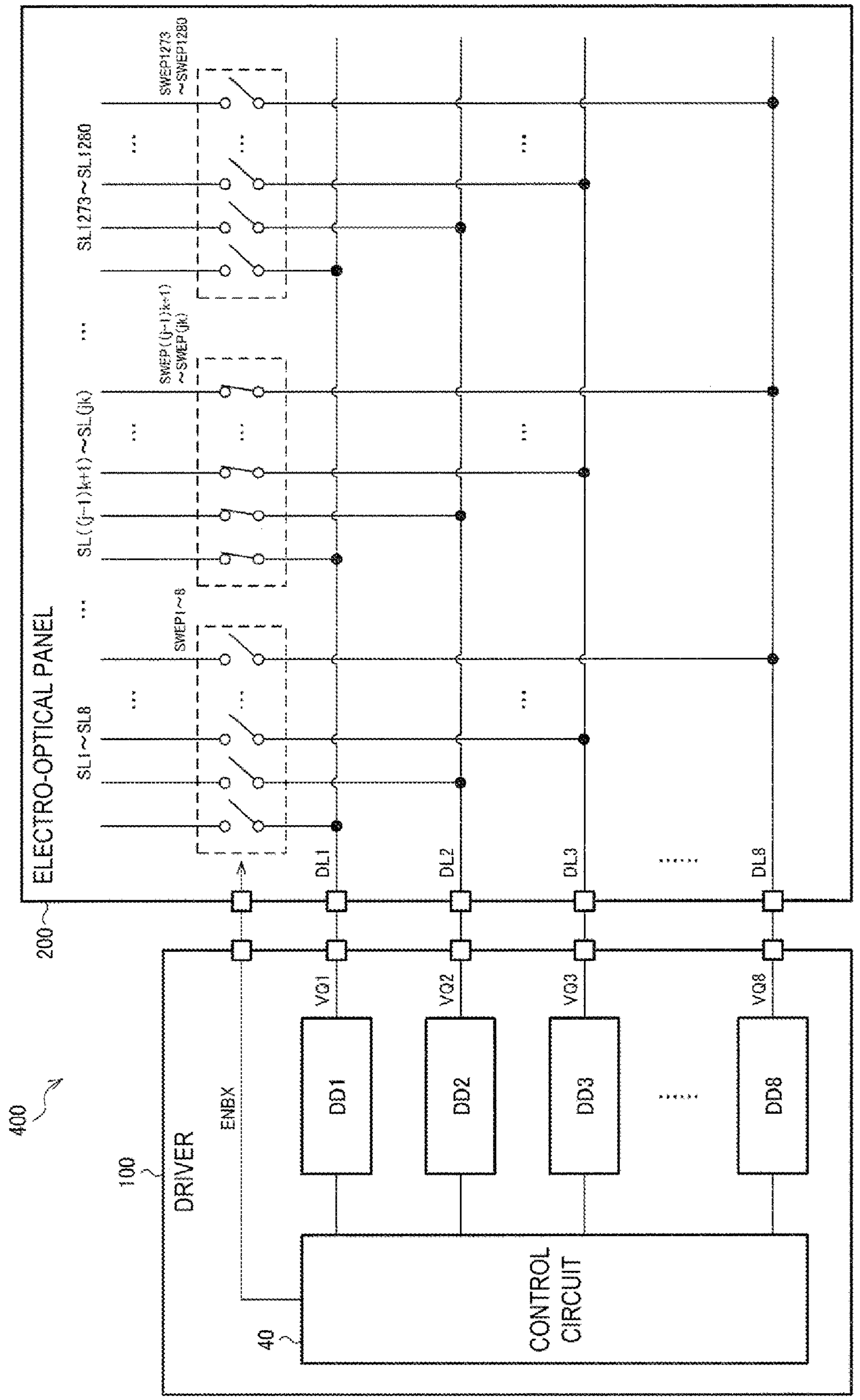
FIG. 1 illustrates a configuration example of an electro-optical device.

FIG. 1 illustrates a configuration example of an electro-optical device. The electro-optical device 400 includes a driver 100 and an electro-optical panel 200. Hereinafter, although the electro-optical device 400 of a phase development driving method will be described as an example, the electro-optical device 400 is not limited thereto, and may be of a demultiplex driving method, for example.

The driver 100 drives the electro-optical panel 200 by outputting a data voltage to signal supply lines of the electro-optical panel 200. A scanning-line drive circuit that drives scanning lines of the electro-optical panel 200 may be included in the driver 100 or may be provided outside the driver 100. The driver 100 is, for example, an integrated circuit device in which a plurality of circuit elements are integrated on a semiconductor substrate. The driver 100 includes a control circuit 40 and first to k-th data-line drive circuits DD1 to DDk, where k is an integer of two or more. Further, in the following, a case in which k=8 will be described as an example.

The control circuit 40 outputs corresponding gradation data to each of the data-line drive circuits DD1 to DD8. The control circuit 40 also outputs a control signal ENBX for controlling a data-line switch to the electro-optical panel 200.

The data-line drive circuits DD1 to DD8 convert the gradation data into a data voltage, and output the data voltage to signal supply lines DL1 to DL8 of the electro-optical panel 200 as output voltages VQ1 to VQ8.

The electro-optical panel 200 includes first to eighth signal supply lines DL1 to DL8, first to 1280th data-line switches SWEP1 to SWEP1280, and first to 1280th data lines SL1 to SL1280. The number of data lines may be k×t, where t is an integer of two or more. Here, WXGA is taken as an example, and t=160.

One ends of the data-line switches SWEP ((j−1)×k+1) to SWEP (j×k) among the data-line switches SWEP1 to SWEP1280 are coupled to the signal supply lines DL1 to DL8, where j is an integer of 160 or more. For example, when j=1, the switches are the data-line switches SWEP1 to SWEP8.

Each of the data-line switches SWEP1 to SWEP1280 is formed as, for example, a TFT, and is controlled based on a control signal ENBX. TFT is an abbreviation for thin film transistor. For example, the electro-optical panel 200 includes a switch control circuit, which is not illustrated, and the switch control circuit controls the data-line switches SWEP1 to SWEP1280 such that the switches are turned on or off based on the control signal ENBX.

The data-line drive circuits DD1 to DD8 perform driving 160 times in a horizontal scanning period, the data-line switches SWEP ((j−1)×k+1) to SWEP (j×k) are on in the j-th driving, and the other data-line switches are off. Thus, the data lines SL ((j−1)×k+1) to SL (j×k) are driven in the j-th driving. Focusing on the data-line drive circuit DD1, the data-line switches SWEP1, SWEP2, . . . , and SWEP1273 are sequentially turned on in the horizontal scanning period, and thus the data-line drive circuit DD1 sequentially drives the data lines SL1, SL2, . . . , and SL1273.

2. Driver

Figure 2:
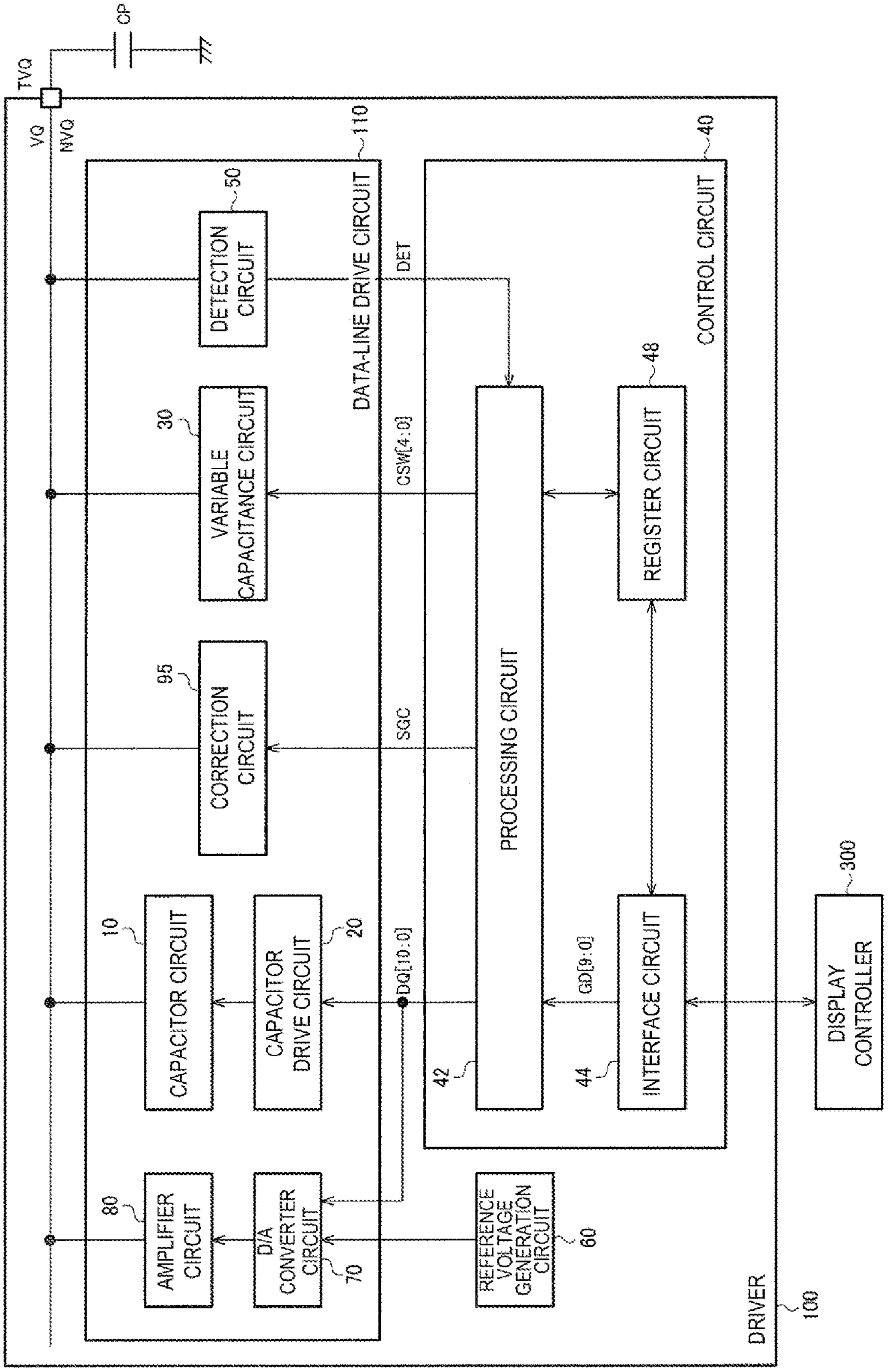
FIG. 2 illustrates a detailed configuration example of a driver.

FIG. 2 is a detailed configuration example of the driver. The driver 100 includes a data-line drive circuit 110, a control circuit 40, and a reference voltage generation circuit 60. The data-line drive circuit 110 corresponds to any one of the data-line drive circuits DD1 to DD8 of FIG. 1. Further, the reference voltage generation circuit 60 is provided in common for the data-line drive circuits DD1 to DD8.

The data-line drive circuit 110 includes a capacitor circuit 10, a capacitor drive circuit 20, a correction circuit 95, a variable capacitance circuit 30, a detection circuit 50, a D/A converter circuit 70, and an amplifier circuit 80. The control circuit 40 includes a processing circuit 42, an interface circuit 44, and a register circuit 48.

The interface circuit 44 performs processing for the interface between a display controller 300 that controls the driver 100 and the driver 100. The interface circuit 44 outputs gradation data GD [9:0] received from the display controller 300 to the processing circuit 42. Further, the number of bits of the received gradation data may be arbitrary. The interface circuit 44 is, for example, an image interface circuit of the system of LVDS, parallel RGB, or display port. LVDS is an abbreviation for Low Voltage Differential Signaling.

The processing circuit 42 determines setting data CSW [4:0] of a capacitance value of the variable capacitance circuit 30 and causes the setting data CSW [4:0] to be stored in the register circuit 48 in an initialization process or the like when the driver 100 is powered on. The processing circuit 42 sets the capacitance value of the variable capacitance circuit 30 with the setting data CSW [4:0] read from the register circuit 48 at the time of a normal operation of driving the electro-optical panel 200. In addition, the processing circuit 42 outputs gradation data DQ [10:0] for capacitive driving to the capacitor drive circuit 20 based on the gradation data GD [9:0].

An output node NVQ is a node to be coupled to a data voltage output terminal TVQ, and a voltage of this output node NVQ is set as an output voltage VQ. A load capacitance of the data voltage output terminal TVQ is set to an electro-optical panel-side capacitance CP. The capacitor drive circuit 20 drives the capacitor circuit 10 based on the gradation data DQ [10:0]. Thus, the capacitor circuit 10 supplies charge to the output node NVQ, and the charges are redistributed to the capacitor circuit 10, the variable capacitance circuit 30, and the electro-optical panel-side capacitance CP. As a result, the output voltage VQ becomes a data voltage corresponding to the gradation data DQ [10:0]. Hereinafter, driving by the capacitor circuit 10 and the capacitor drive circuit 20 will be referred to as capacitive driving.

Figure 3:
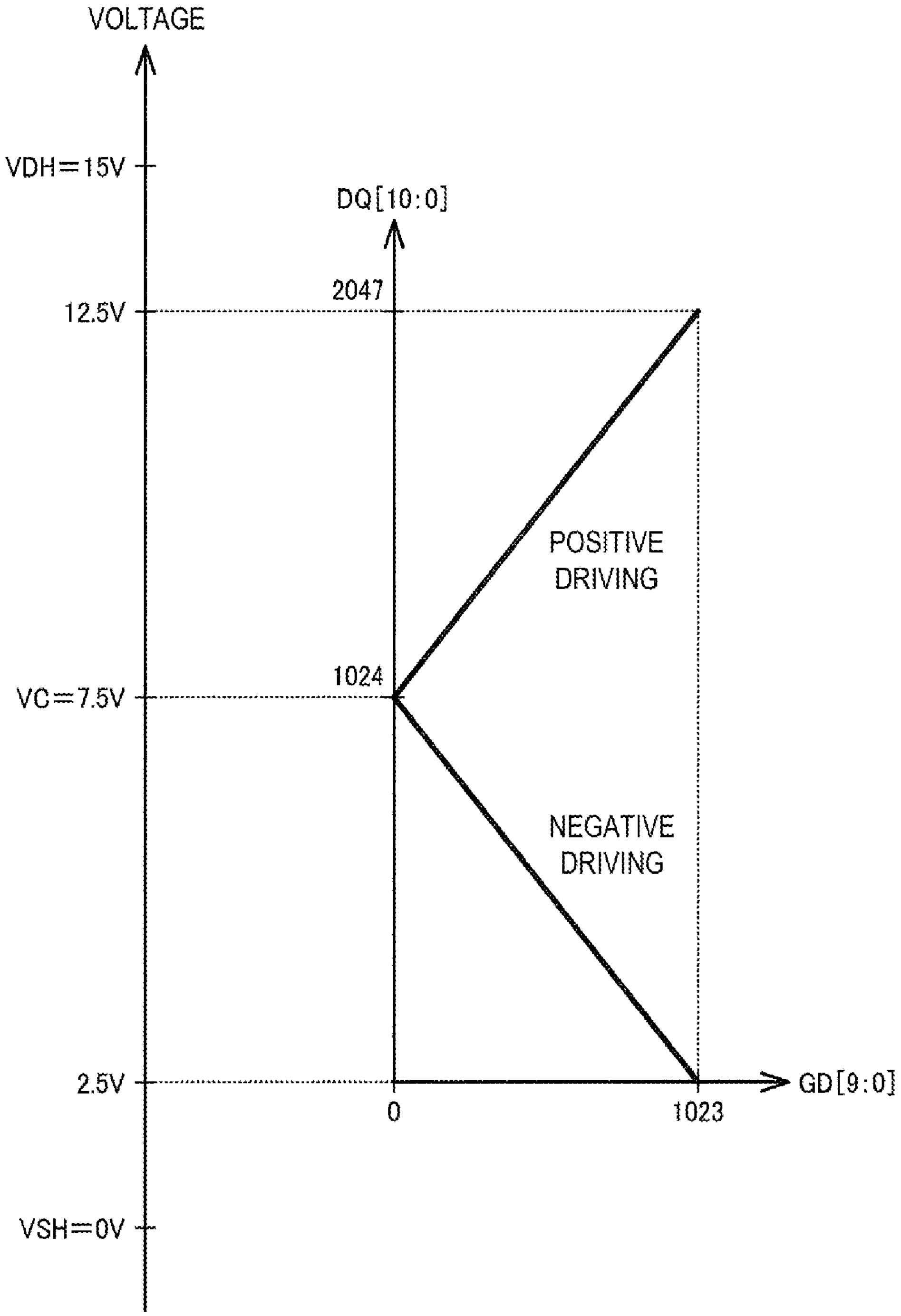
FIG. 3 illustrates a diagram for describing a relationship between gradation data and a data voltage.

FIG. 3 is a diagram for describing a relationship between gradation data and a data voltage. The processing circuit 42 converts input gradation data GD [9:0] into gradation data DQ [10:0]. Specifically, the processing circuit 42 converts gradation values 0 to 1023 of the gradation data GD [9:0] to gradation values 1023 to 0 of the gradation data DQ [10:0] in negative driving, and converts gradation values 0 to 1023 of the gradation data GD [9:0] to the gradation values 1024 to 2047 of the gradation data DQ [10:0] in positive driving.

VSH=0 V is a low potential-side power supply voltage of the capacitor drive circuit 20. VDH=15 V is a high potential-side power supply voltage of the capacitor circuit 10. A common voltage supplied to a counter electrode of the electro-optical panel 200 is VC=7.5 V. A data voltage supplied to a pixel is 7.5 V to 2.5 V in negative driving, and 7.5 V to 12.5 V in positive driving.

The reference voltage generation circuit 60 generates a reference voltage corresponding to each gradation value of the gradation data DQ [10:0]. Specifically, 2048 reference voltages corresponding to gradation values 0 to 2047 are generated.

The D/A converter circuit 70 performs D-A conversion on the gradation data GD [10:1] based on a plurality of reference voltages from the reference voltage generation circuit 60. Specifically, the D/A converter circuit 70 selects a reference voltage corresponding to the gradation data DQ [10:0] from among the 2048 reference voltages and outputs the selected reference voltage to the amplifier circuit 80.

The amplifier circuit 80 buffers an output voltage of the D/A converter circuit 70 and outputs the buffered voltage to the output node NVQ. Hereinafter, driving by the amplifier circuit 80 will be referred to as amplifier driving or voltage driving.

The correction circuit 95 corrects the output voltage VQ by charge redistribution using a correction capacitor circuit. As will be described later, at the timing when amplifier driving is started after capacitive driving is started, there may be a voltage difference between the voltage of the signal supply lines reached due to the capacitive driving and the target voltage corresponding to the gradation data DQ [10:0]. The correction circuit 95 corrects the voltage difference at that timing when amplifier driving is started.

Specifically, the processing circuit 42 acquires correction data based on the detection result of the detection circuit 50 in an initialization process when the driver 100 is powered on, a blanking period, or the like, and stores the correction data in the register circuit 48. This acquisition method will be described later. At the time of driving, the processing circuit 42 outputs a correction signal SGC for setting a correction voltage to the correction circuit 95 based on the gradation data DQ [10:0] and the correction data stored in the register circuit 48. The correction circuit 95 corrects the output voltage VQ by the correction voltage by injecting charges into the output node NVQ or discharging charges from the output node NVQ based on the correction signal SGC. Further, since the correction voltage is determined by the amount of charges injected or discharged by the correction circuit 95, "the correction signal SGC for setting a correction voltage" may be rephrased as "the correction signal SGC for setting an amount of charges injected into the output node NVQ or discharged from the output node NVQ by the correction circuit 95".

Hereinafter, a configuration example of a capacitance value determination method of the variable capacitance circuit 30 and the variable capacitance circuit 30 will be described. Further, although the number of bits of the setting data of the variable capacitance circuit 30 is set to five here, the number of bits of the setting data may be two or more.

The detection circuit 50 compares a given detection voltage with the output voltage VQ and outputs the comparison result as a detection signal DET. The detection circuit 50 is, for example, a comparator.

The processing circuit 42 outputs the gradation data DQ [10:0] corresponding to the given data voltage to the capacitor drive circuit 20. At this time, the given detection voltage is set to the same voltage as the given data voltage which is an expected value of the output voltage VQ. The processing circuit 42 sequentially changes the capacitance value of the variable capacitance circuit 30 by sequentially changing the value of the setting data CSW [4:0]. The processing circuit 42 determines a capacitance value of the variable capacitance circuit 30 based on the detection signal DET at each capacitance value. That is, the processing circuit 42 determines a capacitance value at which the output voltage VQ becomes the given detection voltage based on the detection signal DET, and stores the setting data CSW [4:0] at the capacitance value in the register circuit 48.

The variable capacitance circuit 30 includes first to fifth adjustment capacitors and first to fifth adjustment switches. One end of the first adjustment switch is coupled to the output node NVQ, and the other end thereof is coupled to one end of the first adjustment capacitor. The other end of the first adjustment capacitor is coupled to the ground node. The same applies to the second to fifth adjustment capacitors and the second to fifth adjustment switches. Capacitance values of the first to fifth adjustment capacitors are weighted in binary. The first adjustment switch is controlled such that the switch is turned on or off by CSW [0]. Similarly, the second to fifth adjustment switches are controlled such that the switches are turned on or off by CSW [1] to CSW [4].

Figure 4:
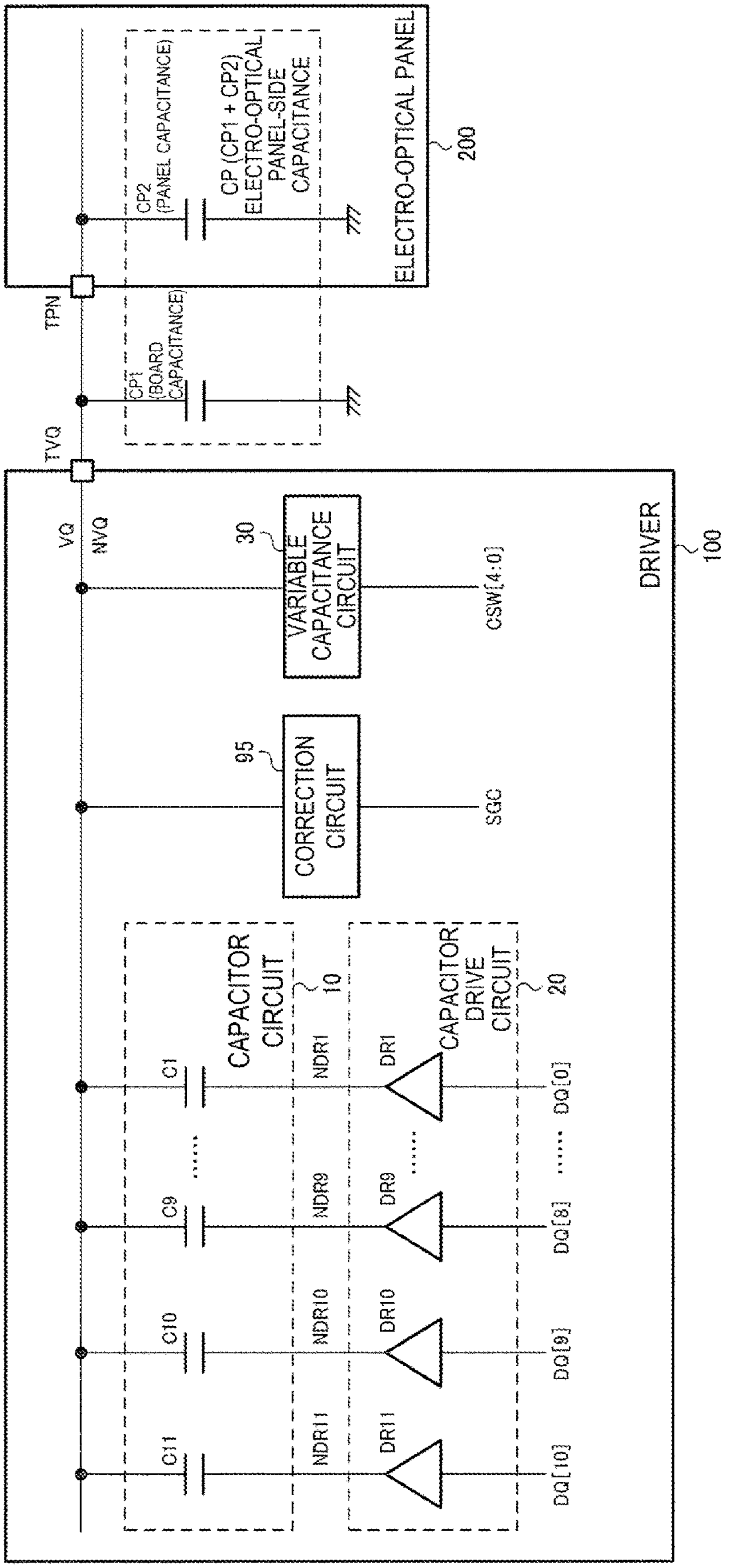
FIG. 4 illustrates a detailed configuration example of a capacitor circuit and a capacitor drive circuit, and an example of an electro-optical panel-side capacitance.

FIG. 4 illustrates a detailed configuration example of the capacitor circuit and the capacitor drive circuit, and an example of an electro-optical panel-side capacitance. Further, in the following, for reference symbol indicating a capacitance value of a capacitor, the same reference symbol as that of the capacitor will be used. For example, a capacitance value of a capacitor C1 will be denoted by C1. In addition, for a reference symbol indicating a value of data, the same reference symbol as that of the data will be used. For example, when a gradation value of the gradation data DQ [10:0] is focused on, the gradation value will be denoted by DQ.

The capacitor circuit 10 includes first to n-th capacitors C1 to Cn. The capacitor drive circuit 20 includes first to n-th drive circuits DR1 to DRn. Although an example of n=11 will be described in the following, n may be an integer of two or more. n may be set to the same number as the number of bits of the gradation data DQ [10:0].

One end of the capacitor Ci is coupled to the output node NVQ, and the other end thereof is coupled to a capacitor drive node NDRi, where i is an integer of 1 or more and equal to or smaller than n=11. The capacitors C1 to C10 each have a capacitance value weighted in binary. Specifically, a capacitance value of the capacitor Ci is $2^{(i-1)}$×C1.

The processing circuit 42 outputs the i-th bit DQ [i−1] of the gradation data DQ [10:0] to the input node of the drive circuit DRi. The drive circuit DRi outputs a first voltage level when a bit DQ [i−1] is at a first logic level and outputs a second voltage level when the DQ [i−1] is at a second logic level to the capacitor drive node NDRi. For example, the first logic level is "0", the second logic level is "1", the first voltage level is a low potential-side power supply voltage VSH, and the second voltage level is a high potential-side power supply voltage VDH. For example, the drive circuit DRi includes a level shifter that shifts an input logic level to an output voltage level of the drive circuit DRi and a buffer circuit that buffers the output of the level shifter.

When the drive circuits DR1 to DR11 drive the capacitors C1 to C11, charge redistribution occurs among the capacitors C1 to C11, the variable capacitance circuit 30, and the electro-optical panel-side capacitance CP. As a result, the data voltage is then output to the output node NVQ.

The electro-optical panel-side capacitance CP is the total capacitance from the point of view of the data voltage output terminal TVQ. For example, the electro-optical panel-side capacitance CP is the sum of a board capacitance CP1 that is a parasitic capacitance of a printed board, and a panel capacitance CP2 that is parasitic capacitance inside the electro-optical panel 200. The printed board is a board on which the driver 100 is mounted and which is coupled to the electro-optical panel 200.

It is assumed that the sum of the capacitance values of the capacitors C1 to C11 is Ctot=C1+C2+ . . . +C11, and the capacitance value of the variable capacitance circuit 30 is CF. As an example, CF is set such that Ctot/(CF+CP)=2. At this time, at the maximum gradation value DQ=2047, VQ=15 V×{Ctot/(Ctot+CF+CP)}+2.5 V=10 V+2.5 V=12.5 V is satisfied. At the minimum gradation value DQ=0, VQ=0 V×{Ctot/(Ctot+CF+CP)}+2.5 V=0 V+2.5 V=2.5 V is satisfied. As a result, the same data voltage as in the example of FIG. 3 is realized.

Further, the charges of the output node NVQ are initialized in the blanking period or the like. As an example, the initialization voltage 2.5 V is supplied to the output node NVQ, and the gradation value DQ [10:0] of the gradation value DQ=0 indicating the voltage is input to the capacitor drive circuit 20.

Figure 5:
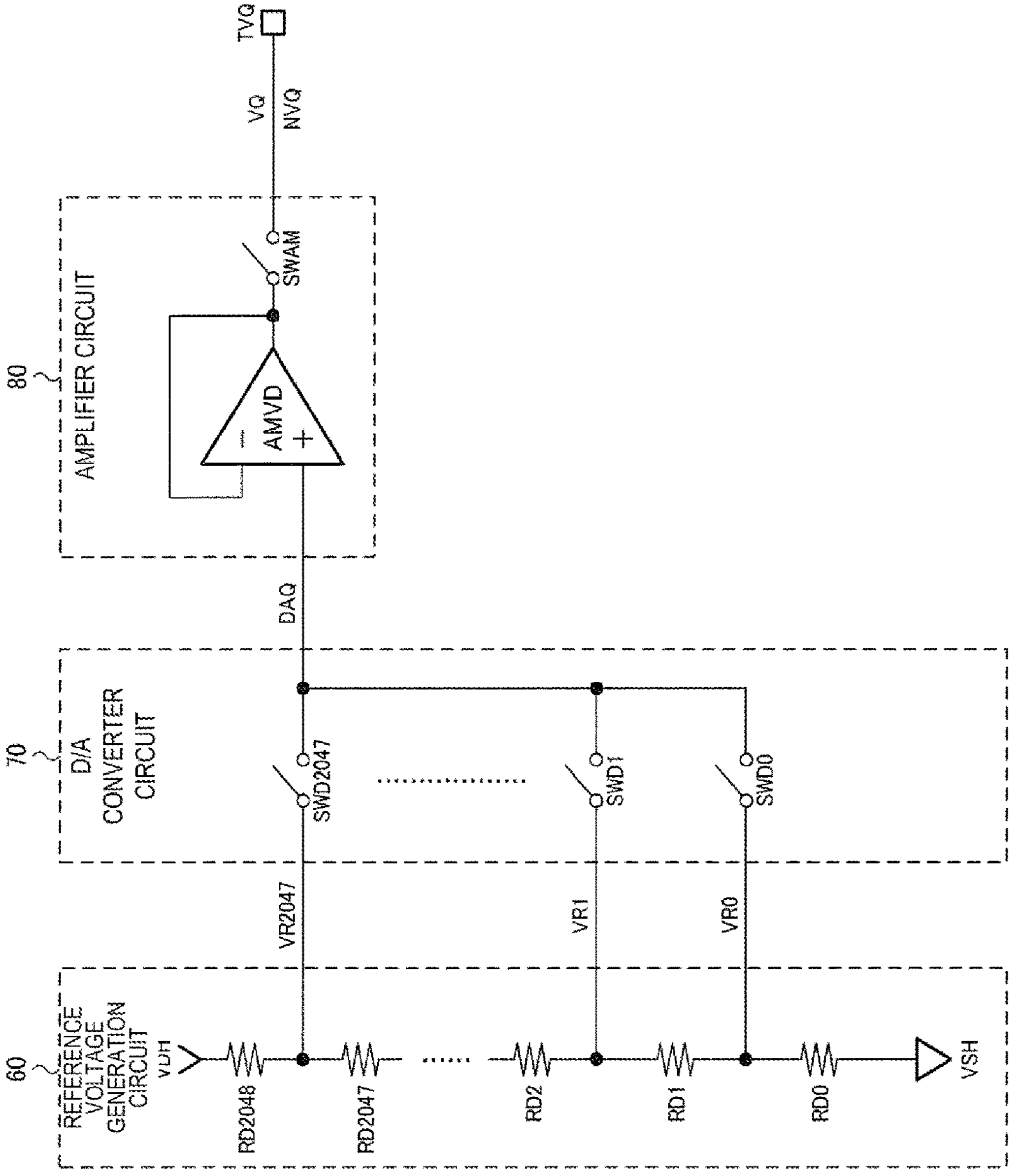
FIG. 5 illustrates a detailed configuration example of a reference voltage generation circuit, a D/A converter circuit, and an amplifier circuit.

FIG. 5 is a detailed configuration example of the reference voltage generation circuit, the D/A converter circuit, and the amplifier circuit.

The reference voltage generation circuit 60 includes resistors RD0 to RD2048 coupled in series between the node of the low potential-side power supply voltage VSH and the node of the high potential-side power supply voltage VDH. A reference voltage VR0 is output to the node between the resistor RD0 and the resistor RD1. The reference voltage VR0 is a voltage corresponding to the gradation value 0. Similarly, reference voltages VR1 to VR2047 are output to the node between the resistor RD1 and the resistor RD2 to the node between the resistor RD2047 and the resistor RD2048. The reference voltages VR1 to VR2047 are voltages corresponding to the gradation values 0 to 2047.

The D/A converter circuit 70 includes switches SWD0 to SWD2047. Each of the switches is an analog switch, and is, for example, an N-type transistor, a P-type transistor, or a transfer gate in which these transistors are coupled in parallel. A reference voltage VR0 is input to one end of the switch SWD0. Similarly, the reference voltages VR1 to VR2047 are input to one ends of the switches SWD1 to SWD2047. The other ends of the switches SWD0 to SWD2047 are coupled together. When the gradation value of the gradation data DQ [10:0] is 0, the switch SWD0 is turned on, and the D/A converter circuit 70 outputs the reference voltage VR0 as an output voltage DAQ. Similarly, when the gradation value is 1 to 2047, the switches SWD1 to SWD2047 are turned on, and the D/A converter circuit 70 outputs the reference voltages VR1 to VR2047 as an output voltage DAQ. Further, the D/A converter circuit 70 is not limited to having the configuration illustrated in FIG. 5. For example, it may have a tournament-type configuration in which switches are provided in multiple stages and selected in a tournament method.

The amplifier circuit 80 includes an operational amplifier AMVD and a switch SWAM.

The output voltage DAQ of the D/A converter circuit 70 is input to a non-inverting input terminal of the operational amplifier AMVD. The output terminal of the operational amplifier AMVD is coupled to an inverting input terminal, which constitutes a so-called voltage follower circuit.

The switch SWAM is an analog switch, and is, for example, an N-type transistor, a P-type transistor, or a transfer gate in which these transistors are coupled in parallel. One end of the switch SWAM is coupled to the output terminal of the operational amplifier AMVD, and the other thereof is coupled to the output node NVQ. The switch SWAM makes coupling or decoupling of an output of the voltage follower circuit and the output node NVQ based on a control signal from the control circuit 40.

3. Correction Target and Correction Method

Figure 6:
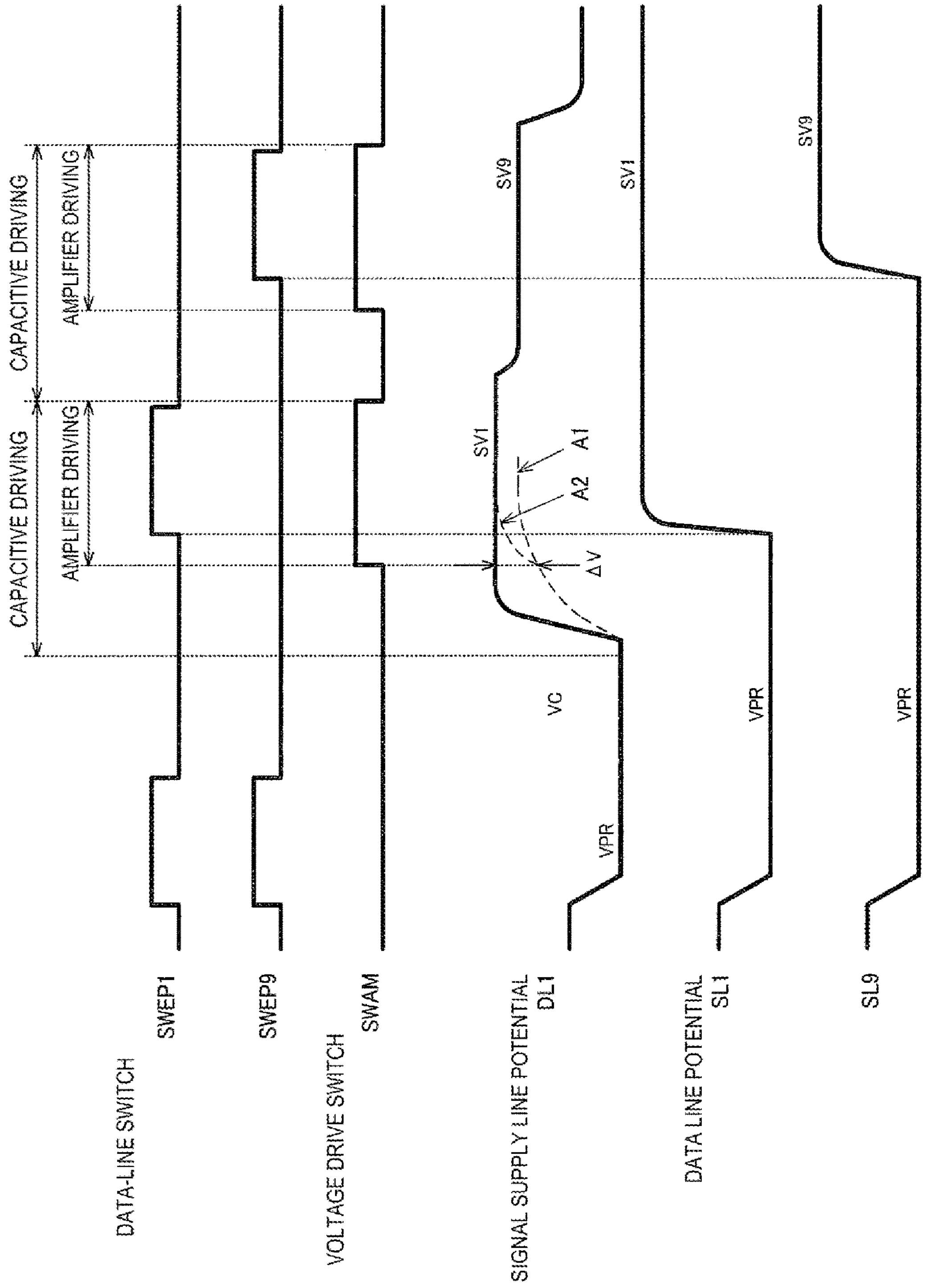
FIG. 6 illustrates a signal waveform example of an electro-optical device.

FIG. 6 is a signal waveform example of the electro-optical device. Here, a signal waveform example with respect to the data lines SL1 and SL9 in one horizontal scanning period in the example in which the data-line drive circuit 110 is the data-line drive circuit DD1 of FIG. 1 will be described.

First, basic operations of capacitive driving and amplifier driving will be described. The data-line switches SWEP1 and SWEP9 are turned on, and the data-line drive circuit DD1 outputs a precharge voltage VPR. As a result, the signal supply line DL1 and the data lines SL1 and SL9 are charged at the precharge voltage VPR. Next, the data-line switches SWEP1 and SWEP9 are turned off.

Next, the capacitor circuit 10 and the capacitor drive circuit 20 start capacitive driving, and the signal supply line DL1 gradually approaches a data voltage SV1. Next, the switch SWAM of the amplifier circuit 80 is turned on to start amplifier driving, and the amplifier circuit 80 drives the signal supply line DL1 at the data voltage SV1. Next, the data-line switch SWEP1 is turned on, so the signal supply line DL1 is coupled to the data line SL1, the data line SL1 is charged, and then the data-line switch SWEP1 is turned off. Next, the switch SWAM of the amplifier circuit 80 is turned off to end the amplifier driving.

Next, the capacitor circuit 10 and the capacitor drive circuit 20 start capacitive driving, and the signal supply line DL1 gradually approaches a data voltage SV9. Next, the switch SWAM of the amplifier circuit 80 is turned on to start amplifier driving, and the amplifier circuit 80 drives the signal supply line DL1 at the data voltage SV9. Next, the data-line switch SWEP9 is turned on, so the signal supply line DL1 is coupled to the data line SL9, the data line SL9 is charged, and then the data-line switch SWEP9 is turned off. Next, the switch SWAM of the amplifier circuit 80 is turned off to end the amplifier driving.

When only capacitive driving is used, there is a possibility that an error may occur between the data voltages SV1 and SV9 that are target voltages and the voltage of the signal supply line DL1 due to errors in charges. By combining amplifier driving with capacitive driving, the amplifier circuit 80 can absorb errors in charges and set the voltage of the signal supply line DL1 to the target voltage. Thus, the data voltages SV1 and SV9 can be accurately written to the data lines SL1 and SL9.

Next, correction performed by the correction circuit 95 will be described. As indicated by A1 of FIG. 6, there is a case in which the voltage of the signal supply line DL1 is deviated from the data voltage SV1 that is a target voltage at the start timing of the amplifier driving. This voltage difference is set to ΔV. Factors causing ΔV will be described later. As indicated by A2, when the amplifier driving is started, the amplifier circuit 80 causes the voltage of the signal supply line DL1 to gradually approach the data voltage SV1 that is a target voltage in response to the voltage difference ΔV. The voltage can reach the data voltage SV1 in a steady state only through capacitive driving if the capacitive driving is accurately performed, however, if amplifier driving is started at a timing when the voltage does not reach the data voltage SV1 transiently, the amplifier circuit 80 responds.

When the voltage difference ΔV is large, the amplifier circuit 80 needs to respond quickly and flow a large current. For this reason, the power consumption of the amplifier circuit 80 increases or the circuit scale increases. Alternatively, when the amplifier circuit 80 tries to respond to a large voltage difference ΔV quickly, the output voltage of the amplifier circuit 80 may be unstable, and the voltage written to the signal supply line may be inaccurate. For example, when a driving time of one pixel becomes shorter due to an increase in the number of pixels of the electro-optical panel

200, a high frame rate, or the like, the voltage difference ΔV is likely to increase. Therefore, the above-described problem is likely to occur.

Next, factors that cause a voltage difference ΔV will be described. First, a voltage difference ΔV caused by the time constant of capacitive driving will be described.

Figure 7:
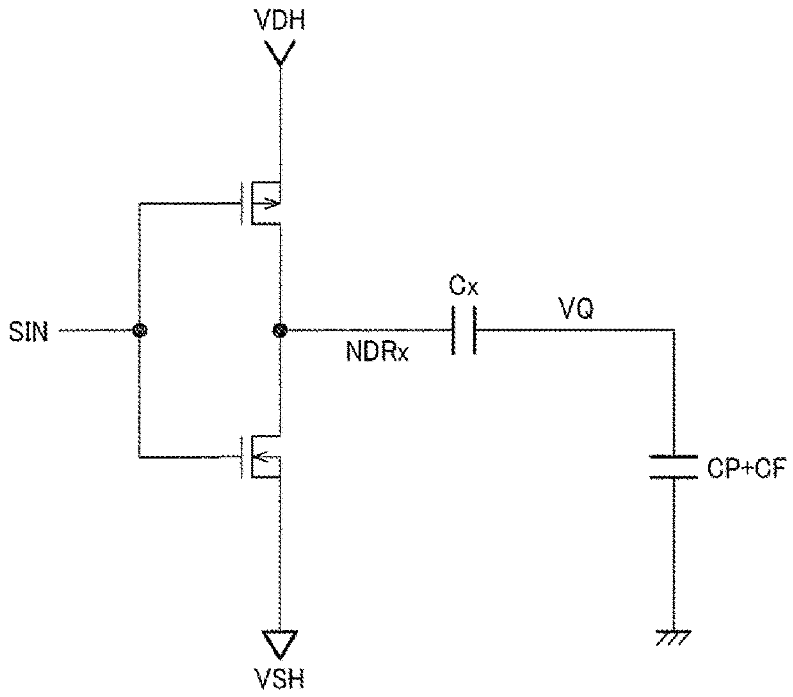
FIG. 7 illustrates a schematic circuit diagram of capacitive driving.

FIG. 7 illustrates a schematic circuit diagram of capacitive driving, and x is an integer of 1 or more and equal to or smaller than n=11. A drive circuit DRx represents an inverter using the high potential-side power supply voltage VDH and the low potential-side power supply voltage VSH as power supplies. An input signal SIN based on a bit signal DQ [x−1] of gradation data is input to the drive circuit DRx. Cx represents a capacitor driven by the drive circuit DRx. CP represents the electro-optical panel-side capacitance, and CF represents the capacitance of the variable capacitance circuit 30.

A case in which the input signal SIN changes from a high level to a low level will be described as an example. Since the P-type transistor of the drive circuit DRx is turned on, the voltage of the capacitor drive node NDRx gradually approaches VDH from VSH. At this time, the P-type transistor has on-resistance between the source and the drain. When the voltage of the capacitor drive node NDRx approaches VDH, the source-drain voltage decreases, and thus the current flowing through the on-resistance decreases. For this reason, the speed at which the output voltage VQ gradually approaches the target voltage also decreases. Since the P-type transistor needs to flow a larger current as the target voltage becomes higher, the influence of the decrease in current becomes larger.

Figure 8:
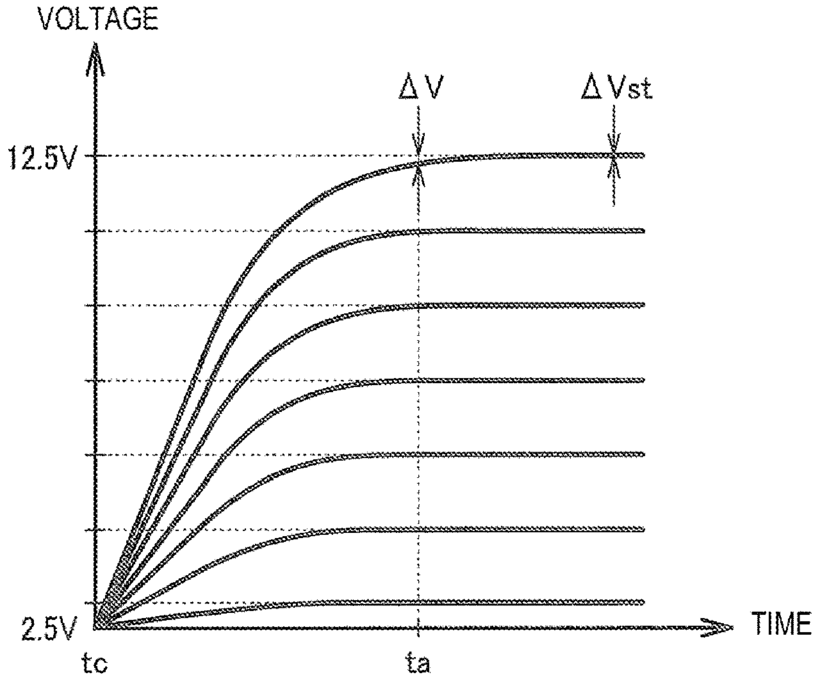
FIG. 8 illustrates a diagram for describing a voltage difference caused by a time constant of capacitive driving.

FIG. 8 is a diagram for describing a voltage difference caused by a time constant of capacitive driving at various target voltages. Capacitive driving is started at a time tc, and amplifier driving is started at a time ta. The dotted lines parallel to the horizontal axis indicate target voltages, and the waveforms of the solid lines indicate output voltages VQ caused by capacitive driving. Here, it is assumed that the output voltage VQ before driving is a pre-charge voltage, and the pre-charge voltage is 0 V.

The output voltage VQ caused by capacitive driving changes with a time constant determined by the on-resistance and the capacitance of the capacitor Cx and the like described in FIG. 7. A difference between the output voltage VQ and the target voltage in the steady state is denoted by ΔVst. Assuming that there is no error in the capacitance ratio of the capacitive driving, ΔVst=0. However, since the output voltage VQ and the target voltage are transiently different from each other, a voltage difference ΔV may occur at the start time ta of amplifier driving. As described with reference to FIG. 7, as the target voltage becomes higher, the voltage difference ΔV becomes larger, and as the start time ta of the amplifier driving becomes closer to the start time tc of the capacitive driving, the voltage difference ΔV becomes larger.

Figure 9:
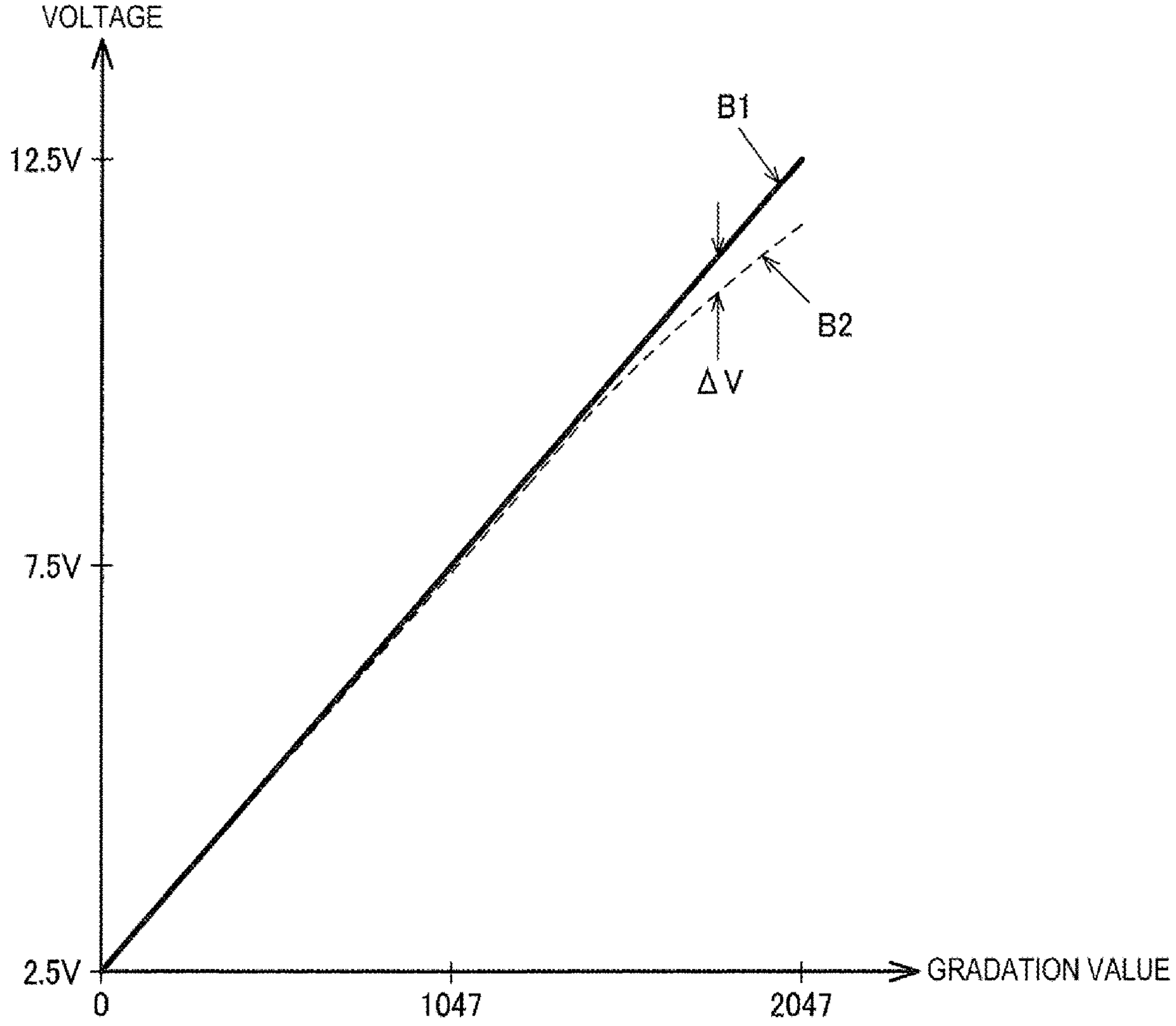
FIG. 9 illustrates an example of a voltage difference caused by a time constant of capacitive driving at each gradation value.

FIG. 9 is an example of the voltage difference caused by the time constant of the capacitive driving at each gradation value. B1 represents a target voltage at each gradation value DQ. B2 represents an output voltage VQ caused by the capacitive driving at the start time ta of the amplifier driving at each gradation value DQ. The voltage difference ΔV has a different value depending on the gradation value DQ, and as described above, the voltage difference ΔV increases as the gradation value DQ increases.

Figure 10:
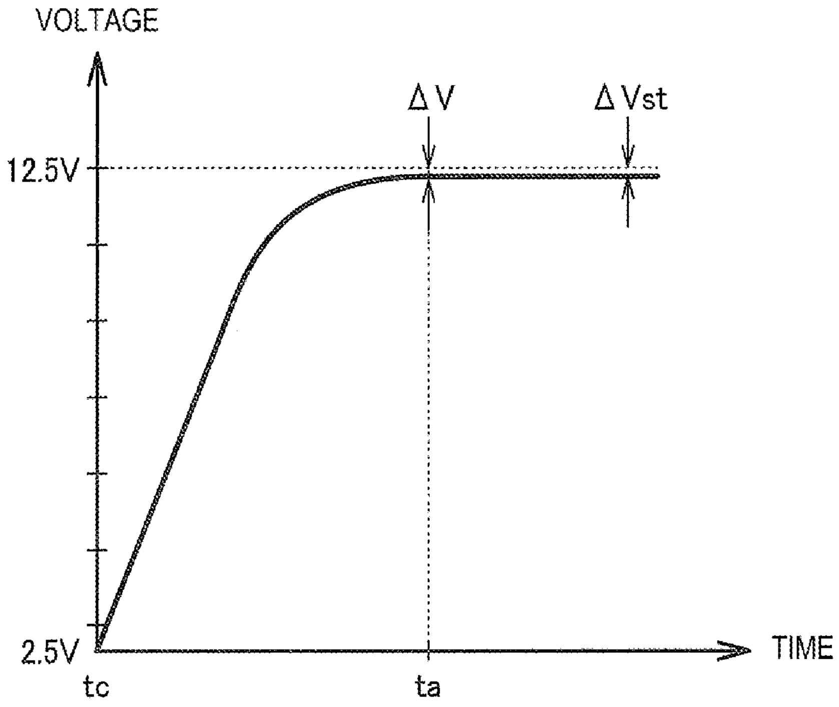
FIG. 10 illustrates a diagram for describing a voltage difference caused by an error in a capacitance ratio of capacitive driving.

FIG. 10 is a diagram for describing a voltage difference caused by an error in a capacitance ratio of capacitive driving. If there is an error in a capacitance ratio Ctot/(CF+CP) or a capacitance ratio between C1 to C11, the difference between the output voltage VQ and the target voltage in the steady state satisfies ΔVst≠0. Although FIG. 10 illustrates an example in which the output voltage VQ is lower than the target voltage, the output voltage VQ may be higher than the target voltage. Here, it is assumed that amplifier driving is started after the current state reaches the steady state, and ΔV=ΔVst.

Figure 11:
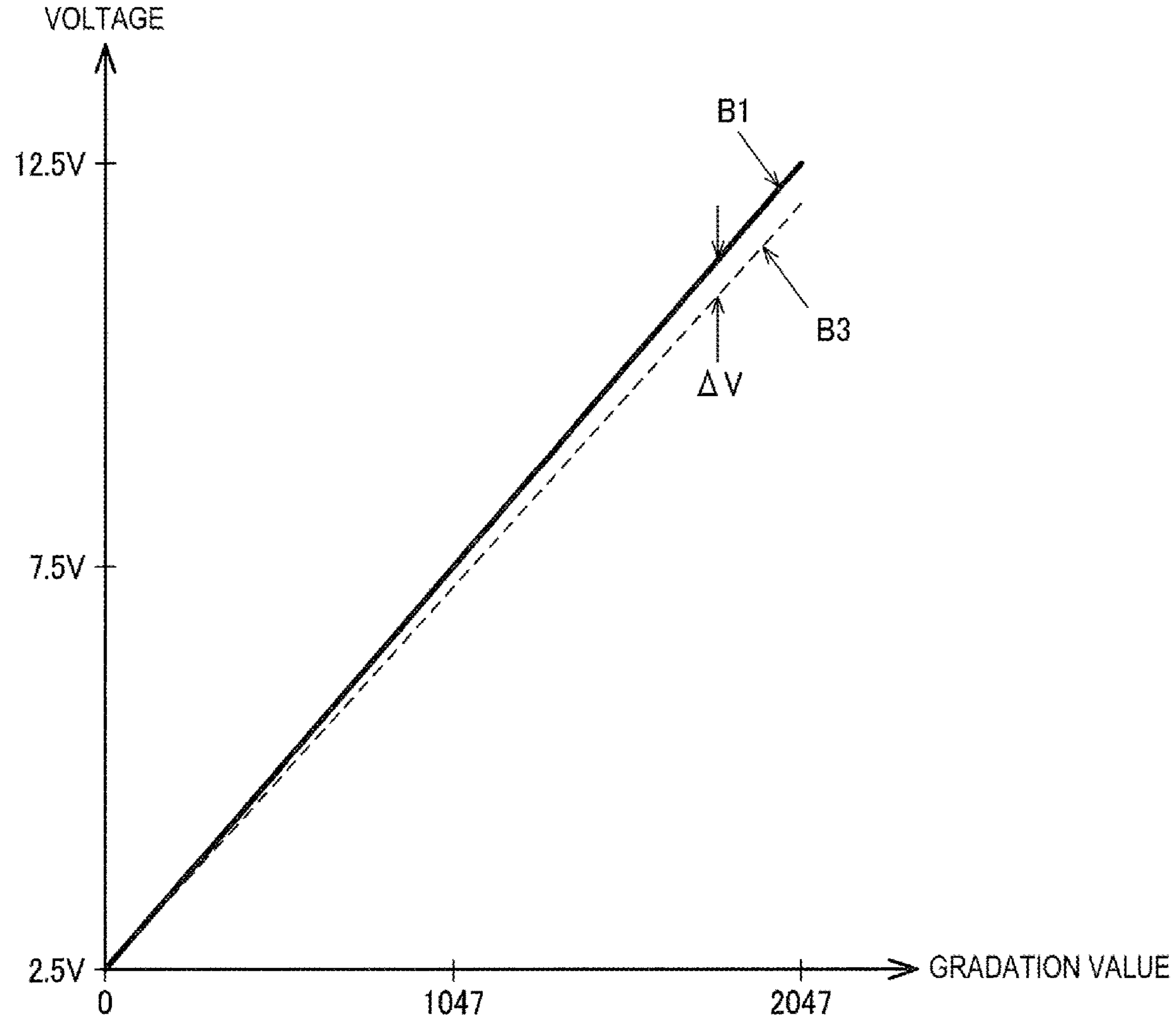
FIG. 11 illustrates an example of a voltage difference caused by an error in a capacitance ratio of capacitive driving at each gradation value.

FIG. 11 is an example of a voltage difference caused by an error in a capacitance ratio of capacitive driving at each gradation value. B3 represents an output voltage VQ caused by the capacitive driving at the start time to of the amplifier driving at each gradation value DQ. The voltage difference ΔV has a different value depending on a gradation value DQ. For example, the voltage difference ΔV caused by the error of the capacitance ratio Ctot/(CF+CP) increases linearly with respect to the gradation values DQ. Alternatively, the voltage difference ΔV caused by errors in a capacitance ratio between C1 to C11 changes nonlinearly with respect to the gradation values DQ.

Figure 12:
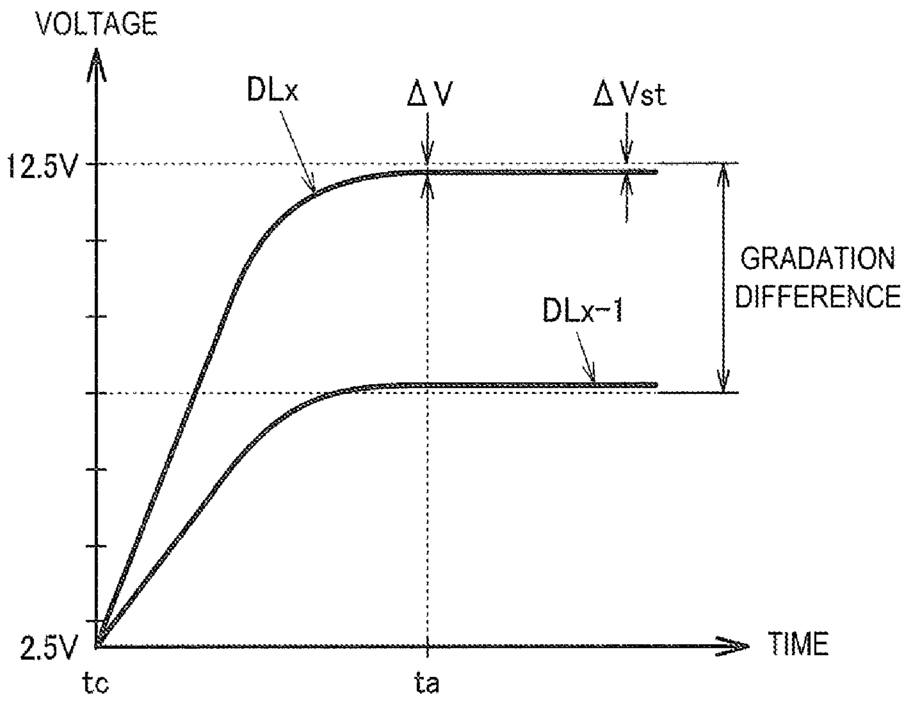
FIG. 12 illustrates a diagram for explaining a voltage difference caused by coupling between signal supply lines.

FIG. 12 is a diagram for describing a voltage difference caused by coupling between signal supply lines. Hereinafter, although coupling between an arbitrary signal supply line DLx and the signal supply line DLx−1 adjacent thereto will be described as an example, the same applies to coupling between the signal supply line DLx and the signal supply line DLx+1 adjacent thereto.

A parasitic capacitance is present between an arbitrary signal supply line DLx and the signal supply line DLx−1 adjacent thereto. For this reason, a charge transfer occurs between the signal supply lines DLx and DLx−1 due to coupling via the parasitic capacitance, and the difference between the output voltage VQ and a target voltage in the steady state satisfies ΔVst≠0. Since the amount of charges transferred by coupling depends on the gradation difference between the gradation value of the signal supply line DLx and the gradation value of the signal supply line DLx−1, ΔVst depends on the gradation difference. FIG. 12 illustrates an example in which the gradation value of the signal supply line DLx is greater than the gradation value of the signal supply line DLx−1.

Figure 13:
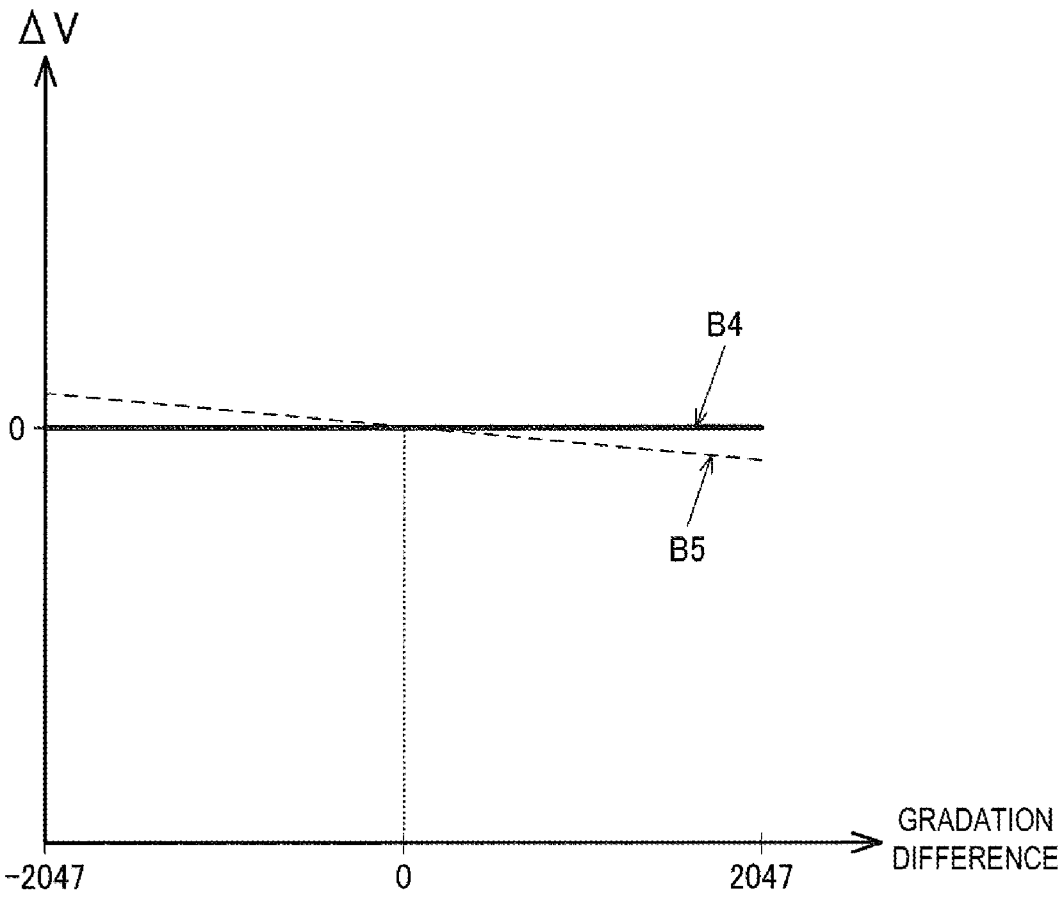
FIG. 13 illustrates an example of a voltage difference caused by coupling between signal supply lines at each gradation value.

FIG. 13 illustrates an example of a voltage difference caused by coupling between the signal supply lines at each gradation value. The horizontal axis represents a gradation difference=(the gradation value of the signal supply line DLx)−(the gradation value of the signal supply line DLx−1). The vertical axis represents the voltage difference ΔV between the output voltage VQ caused by capacitive driving and the target voltage.

B4 represents the voltage difference ΔV=0 when the voltage VQ is equal to the target voltage ideally. B5 represents the voltage difference ΔV caused by coupling between the signal supply lines. ΔV is linear with respect to the gradation difference. In addition, ΔV<0 when the gradation difference >0, and ΔV>0 when the gradation difference <0.

The correction circuit 95 corrects the output voltage VQ with a correction voltage corresponding to the voltage difference ΔV, thereby reducing the difference between the output voltage VQ and the target voltage at the start time to of amplifier driving. Although three factors that cause the voltage difference ΔV have been described above, when it is desired to correct the voltage difference ΔV caused by a plurality of factors, the correction circuit 95 may correct the output voltage VQ with a correction voltage obtained by adding a correction voltage for the respective factors.

Further, the correction voltage may not be equal to the voltage difference ΔV. In other words, the correction voltage may be set such that the output voltage VQ at the start time to of the amplifier driving is closer to the target voltage, rather than not performing correction.

In the embodiment described above, the driver 100 includes the data voltage output terminal TVQ, the capacitor drive circuit 20, the capacitor circuit 10, the processing circuit 42, and the correction circuit 95. The data voltage output terminal TVQ is electrically coupled to the signal supply lines of the electro-optical panel 200. The capacitor drive circuit 20 outputs each of the first to n-th capacitor drive voltages corresponding to the gradation values to a respective one of the first to n-th capacitor driving nodes NDR1 to NDRn, where n is an integer of two or more. The capacitor circuit 10 includes the first to n-th capacitors C1 to Cn each provided between the output node NVQ that is a node of the data voltage output terminal TVQ and a respective one of the first to n-th capacitor driving nodes NDR1 to NDRn. The processing circuit 42 generates a correction signal SGC for correcting the voltage difference ΔV between the output voltage VQ of the output node NVQ and the target voltage corresponding to the gradation data DQ [10:0]. The correction circuit 95 includes a correction capacitor circuit. The correction circuit 95 corrects the voltage difference ΔV with the correction voltage corresponding to the voltage difference ΔV by injecting charges corresponding to a correction signal SGC into the output node NVQ or discharging charges from the output node NVQ by using the correction capacitor circuit.

According to this embodiment, the correction circuit 95 can correct the voltage difference ΔV by redistributing charges by using the correction capacitor circuit. As a result, even when a driving period is shorter than the time required for the voltage of the signal supply lines to reach the target voltage, the output voltage VQ can be made to gradually approach the data voltage quickly. For example, when capacitive driving and amplifier driving are used in combination, the voltage difference ΔV at the start of amplifier driving is corrected, and thereby the voltage difference to be corrected by the amplifier circuit can be reduced. As a result, lower power consumption and a smaller size of the amplifier circuit can be achieved.

Further, the correction capacitor circuit includes at least one correction capacitor as will be described later with reference to FIGS. 14 and 18 to 20, and the correction capacitor injects charges into the output node NVQ or discharges charges from the output node NVQ.

In addition, in this embodiment, the driver 100 includes a storage circuit. The storage circuit stores correction data indicating the correspondence between the gradation data DQ [10:0] and a correction voltage. Based on the correction data, the processing circuit 42 generates a correction signal SGC for correcting the voltage difference ΔV with the correction voltage corresponding to the gradation data DQ [10:0].

According to this embodiment, the correction data acquired in advance before driving is stored in the storage circuit, and the correction circuit 95 can correct the voltage difference ΔV based on the correction data. As a result, the correction circuit 95 can correct the voltage difference ΔV which depends on the gradation value of the gradation data DQ [10:0] based on the correction data.

Further, although FIG. 2 illustrates an example in which the storage circuit is the register circuit 48, the storage circuit is not limited thereto and may be, for example, a volatile memory such as an SRAM or a nonvolatile memory such as an EEPROM or an OTP memory.

In addition, in this embodiment, the driver 100 includes the amplifier circuit 80. The amplifier circuit 80 outputs the data voltage corresponding to the gradation data DQ [10:0] to the output node NVQ.

According to this embodiment, since the correction circuit 95 corrects the voltage difference ΔV between the output voltage VQ of the output node NVQ and the target voltage, the voltage difference ΔV to be corrected by the amplifier circuit 80 is reduced. In addition, even when an error remains between a voltage finally written to a data line and a target voltage due to capacitive driving and correction, an accurate data voltage can be written to the data line by driving the amplifier circuit 80.

In addition, in this embodiment, the correction circuit 95 corrects the voltage difference ΔV between the target voltage and the output voltage VQ reached due to driving by the capacitor drive circuit 20 and the capacitor circuit 10 at the start timing of driving by the amplifier circuit 80.

According to this embodiment, the correction circuit 95 corrects the voltage difference ΔV at the start timing of the amplifier driving. Thus, since the voltage difference to which the amplifier circuit 80 should respond is reduced at the start timing of the amplifier driving, it is possible to reduce the power consumption or the size of the amplifier circuit, or it is possible to stabilize the output of the amplifier circuit 80.

In addition, in this embodiment, the correction circuit 95 starts correction before the start timing of driving by the amplifier circuit 80.

According to this embodiment, since the correction is started before the start timing of the amplifier driving, the voltage difference ΔV at the start timing of the amplifier driving is corrected.

4. Detailed Configuration Example of Correction Circuit

Figure 14:
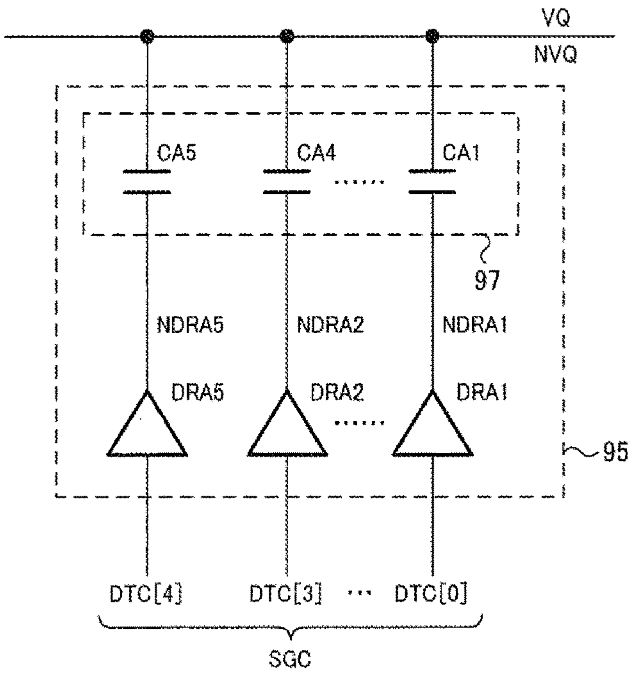
FIG. 14 illustrates a first detailed configuration example of a correction circuit.

FIG. 14 is a first detailed configuration example of the correction circuit. The correction circuit 95 includes a correction capacitor circuit 97 and first to m-th correction drive circuits DRA1 to DRAm. The correction capacitor circuit 97 includes first to m-th correction capacitors CA1 to CAm. Although an example of m=5 will be described in the following, m may be an integer of two or more.

One end of a correction capacitor CAr is coupled to the output node NVQ, and the other end thereof is coupled to a node NDRAr, where r is an integer of 1 or more and equal to or smaller than m=5. The correction capacitors CA1 to CA5 have capacitance values weighted in binary. Specifically, a capacitance value of the correction capacitor CAr is $2^{(r-1)}$×CA1. The capacitance value CA1 is appropriately set in accordance with a necessary resolution of correction.

The correction drive circuit DRAr outputs an r-th correction drive signal to the node NDRAr. Specifically, the processing circuit 42 outputs setting data DTC [4:0] as a correction signal SGC to the correction circuit 95. The r-th bit DTC [r−1] of the setting data DTC [4:0] is input to the input node of the correction drive circuit DRAr. The correction drive circuit DRAr outputs a first voltage level when the bit DTC [r−1] is at a first logic level to the node NDRAr and outputs a second voltage level when the bit DTC [r−1] is at a second logic level to the node NDRAr. For example, the first logic level is "0", the second logic level is "1", the first voltage level is a low potential-side power supply voltage of the correction drive circuit DRAr, and the second voltage level is a high potential-side power supply voltage of the correction drive circuit DRAr. For example, the correction drive circuit DRAr includes a level shifter that shifts an input logic level to an output voltage level of the correction drive circuit DRAr and a buffer circuit that buffers the output of the level shifter.

The amount of charge injected into the output node NVQ or discharged from the output node NVQ by the correction circuit 95 changes in accordance with the setting data DTC [4:0]. That is, the correction voltage is set based on the setting data DTC [4:0]. As described above, the correction voltage changes according to a gradation value or a gradation difference. For this reason, correction data indicating the correspondence between each gradation value or each gradation difference and the setting data DTC [4:0] is stored in the register circuit 48. The processing circuit 42 determines the setting data DTC [4:0] by referring to the correction data based on input gradation data DQ [10:0], and outputs the determined setting data to the correction circuit 95.

Figure 15:
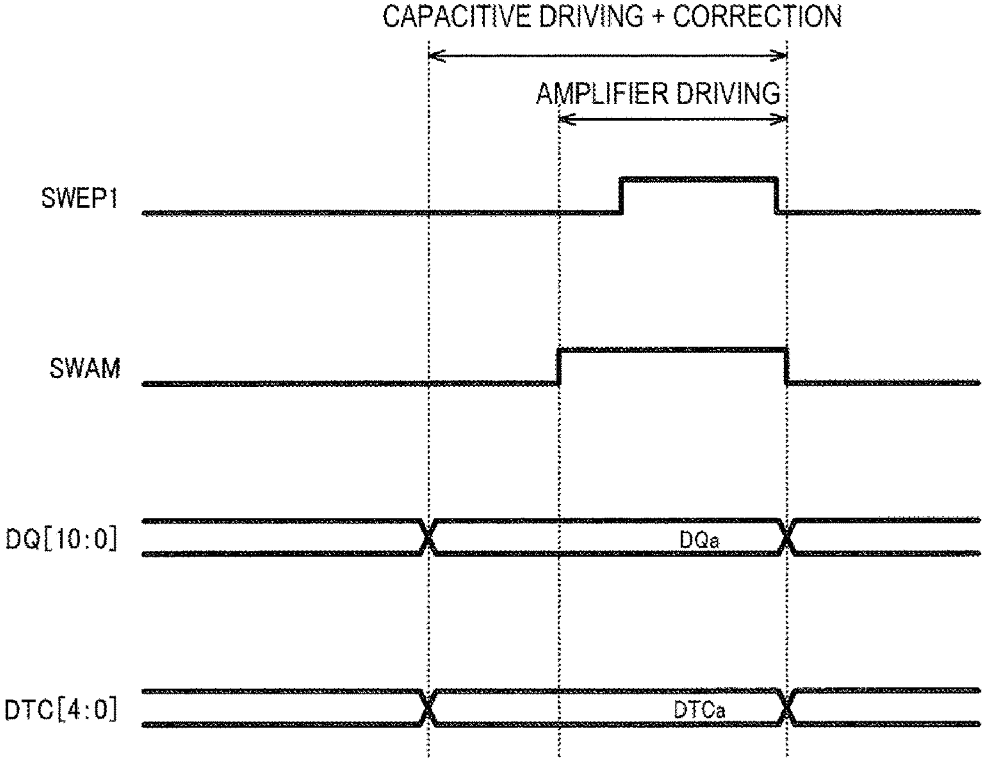
FIG. 15 illustrates a signal waveform example for describing an operation of the correction circuit.

FIG. 15 is a signal waveform example for describing an operation of the correction circuit. When the processing circuit 42 updates a value of the gradation data DQ [10:0] to a gradation value DQa, capacitive driving by the capacitor circuit 10 and the capacitor drive circuit 20 is started. At the same timing, when the processing circuit 42 updates a value of the setting data DTC [4:0] to a set value DTCa, the correction circuit 95 starts correction. Thereafter, when the switch SWAM is turned on, amplifier driving is started, and when the data-line switch SWEPT is turned on, the data line SL1 is driven.

Further, the start timing of correction may be after the start timing of the capacitive driving and before the start of the amplifier driving.

In this embodiment described above, the correction capacitor circuit 97 includes the first to m-th correction capacitors CA1 to CAm each having one end coupled to the output node NVQ. The correction circuit 95 includes the first to m-th correction drive circuits DRA1 to DRAm that each output a respective one of first to m-th correction drive signals based on the correction signal SGC to the other end of a respective one of the first to m-th correction capacitors CA1 to CAm.

According to this embodiment, the other ends of the first to m-th correction capacitors CA1 to CAm are driven due to the first to m-th correction drive signals based on the correction signal SGC. As a result, charges corresponding to the correction signal SGC are injected from the first to m-th correction capacitors CA1 to CAm to the output node NVQ or discharged from the output node NVQ, and thereby the output voltage VQ of the output node NVQ is corrected.

Figure 16:
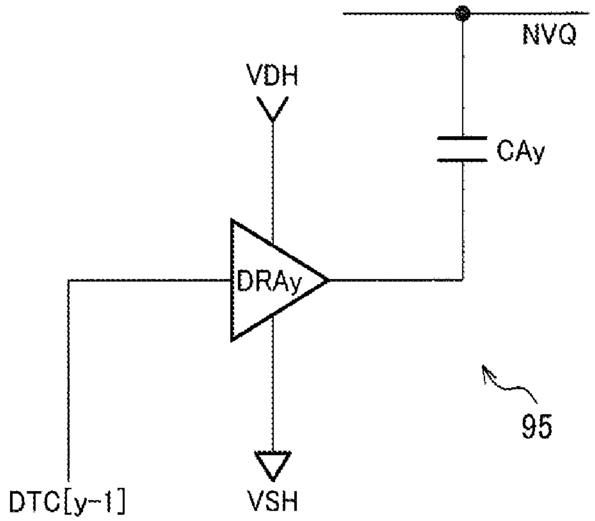
FIG. 16 illustrates a first example of a power supply voltage of a correction drive circuit.

FIG. 16 is a first example of a power supply voltage of a correction drive circuit, and y is an integer of 1 or more and equal to and smaller than m=5. The same high potential-side power supply voltage VDH and low potential-side power supply voltage VSH as those of the drive circuits DR1 to DR11 of the capacitor drive circuit 20 are supplied to a correction drive circuit DRAy. The correction drive circuit DRAy drives the other end of the correction capacitor CAy at the high potential-side power supply voltage VDH or the low potential-side power supply voltage VSH.

Figure 17:
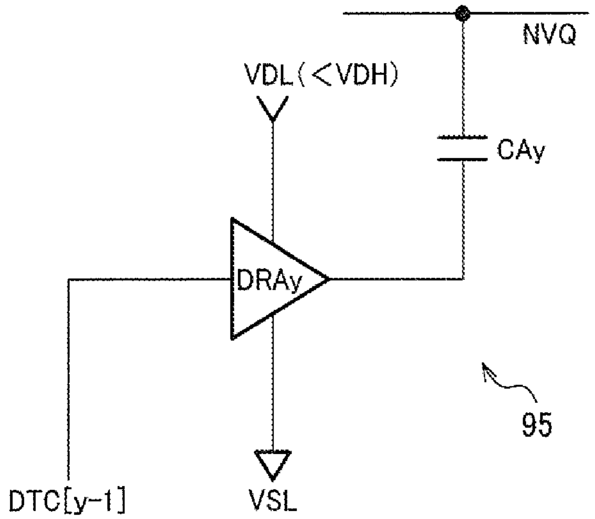
FIG. 17 illustrates a second example of the power supply voltage of the correction drive circuit.

FIG. 17 is a second example of a power supply voltage of the correction drive circuit. A low potential-side power supply voltage VSL and a high potential-side power supply voltage VDL that is different from that of the drive circuits DR1 to DR11 of the capacitor drive circuit 20 are supplied to the correction drive circuit DRAy. VDL is lower than VSH (VDL<VSH). VSL may be equal to VSH (VSL=VSH). The correction drive circuit DRAy drives the other end of the correction capacitor CAy at the high potential-side power supply voltage VDL or the low potential-side power supply voltage VSL.

In this embodiment described above, the power supply voltages of the first to m-th correction drive circuits DRA1 to DRAm are the same as the power supply voltage of the capacitor drive circuit 20. Alternatively, the power supply voltages of the first to m-th correction drive circuits DRA1 to DRAm may be lower than the power supply voltage of the capacitor drive circuit 20.

In the first example of FIG. 16 and the second example of FIG. 17 described above, for example, VDH=15 V, VSH=0 V, VSL=5 V, and VSL=0 V. If the first example and the second example are assumed to have the same capacitance value CAy, the amount of charges for correction in the second example is ⅓ of the amount of charges for correction in the first example. That is, a more minute correction voltage can be generated in the second example than in the first example. On the other hand, in the first example, a high correction voltage can be obtained, or the correction capacitor CAy can be made small.

Figure 18:
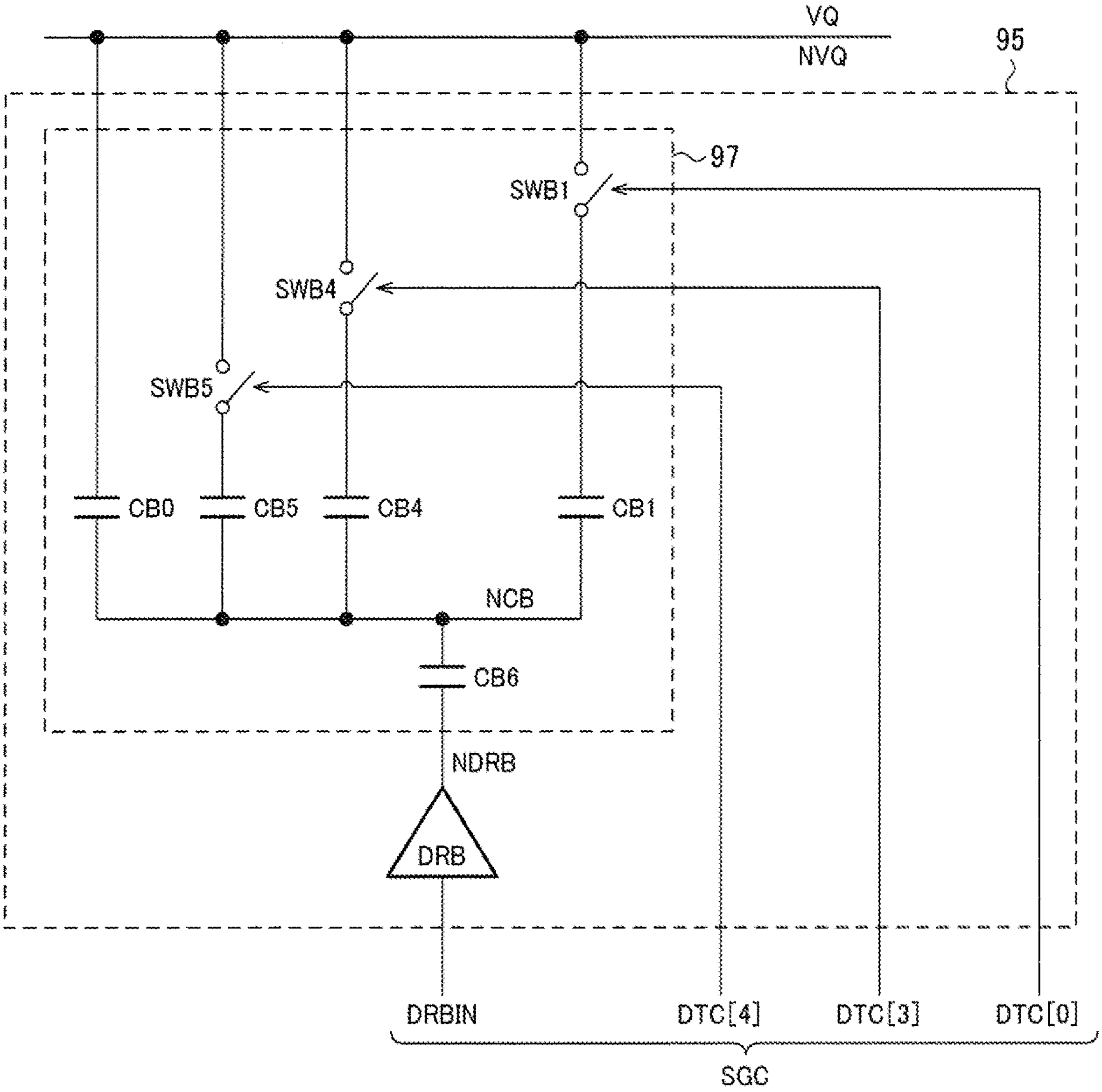
FIG. 18 illustrates a second detailed configuration example of the correction circuit.

FIG. 18 is a second detailed configuration example of the correction circuit. The correction circuit 95 includes the correction capacitor circuit 97 and a correction drive circuit DRB. The correction capacitor circuit 97 includes first to m-th correction switches SWB1 to SWBm and first to (m+2)-th correction capacitors CB1 to CBm+2. The (m+2)-th correction capacitor CBm+2 may be omitted. Although an example of m=5 will be described in the following, m may be an integer of two or more.

One ends of the correction switches SWB1 to SWB5 are coupled to the output node NVQ. The other end of the correction switch SWB1 is coupled to one end of the correction capacitor CB1. Similarly, the other ends of the correction switches SWB2 to SWB5 are coupled to one ends of the correction capacitors CB2 to CB5. The other ends of the correction capacitors CB1 to CB5 are coupled to a node NCB. One end of a correction capacitor CB7 is coupled to the output node NVQ, and the other end thereof is coupled to the node NCB. One end of a correction capacitor CB6 is coupled to the node NCB, and the other end thereof is coupled to a node NDRB. Each of the correction switches SWB1 to SWB5 is an analog switch, and is, for example, an N-type transistor, a P-type transistor, or a transfer gate in which these transistors are coupled in parallel.

The processing circuit 42 outputs a control signal DRBIN and setting data DTC [4:0] as a correction signal SGC to the correction circuit 95. The correction switch SWBr is controlled such that it is turned on or off by a bit signal DTC [r−1] of the setting data DTC [4:0]. The correction drive circuit DRB outputs a first voltage level when the control signal DRBIN is at a first logic level to the node NDRB and outputs a second voltage level when the control signal DRBIN is at a second logic level to the node NDRB. For example, the first logic level is "0", the second logic level is "1", the first voltage level is a low potential-side power supply voltage VSH, and the second voltage level is a high potential-side power supply voltage VDH. For example, the correction drive circuit DRB includes a level shifter that shifts an input logic level to an output voltage level of the correction drive circuit DRB and a buffer circuit that buffers the output of the level shifter.

At the start timing of correction, the processing circuit 42 changes the control signal DRBIN from a low level to a high level when charges are injected, and changes the control signal DRBIN from a high level to a low level when charges are discharged.

In this embodiment described above, the correction capacitor circuit 97 includes the first to m-th correction switches SWB1 to SWBm each having one end coupled to the output node NVQ, the first to m-th correction capacitors CB1 to CBm each having one end coupled to the other end of a respective one of the first to m-th correction switches SWB1 to SWBm, and the (m+1)-th correction capacitor CBm+1 having one end coupled to the other ends of the first to m-th correction capacitors CB1 to CBm. The correction circuit 95 includes the correction drive circuit DRB that outputs a drive signal based on the correction signal SGC to the other end of the (m+1)-th correction capacitor CBm+1.

According to this embodiment, the capacitance value of the correction capacitor circuit 97 is set based on the setting data DTC [4:0] included in the correction signal SGC, and the other end thereof is driven by the correction drive circuit DRB. As a result, the charges corresponding to the setting data DTC [4:0] are injected into the output node NVQ or discharged from the output node NVQ, and thus the output voltage VQ is corrected with the correction voltage corresponding to the setting data DTC [4:0].

Figure 19:
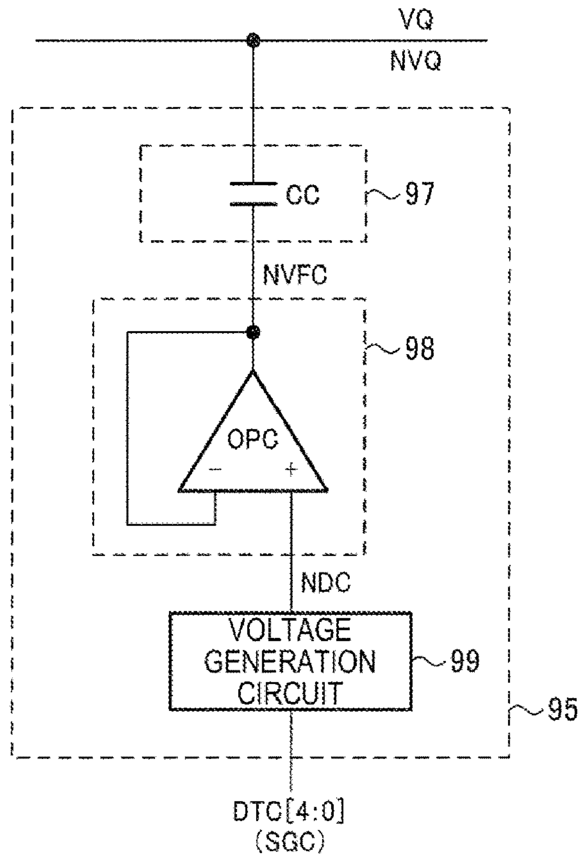
FIG. 19 illustrates a third detailed configuration example of the correction circuit.

FIG. 19 is a third detailed configuration example of the correction circuit. The correction circuit 95 includes a correction capacitor circuit 97, a voltage follower circuit 98, and a voltage generation circuit 99.

The correction capacitor circuit 97 includes a correction capacitors CC. One end of the correction capacitor CC is coupled to the output node NVQ, and the other end thereof is coupled to a node NVFC. The voltage follower circuit 98 includes an operational amplifier OPC. The non-inverting input terminal of the operational amplifier OPC is coupled to a node NDC, and the inverting input terminal thereof is coupled to an output terminal. The processing circuit 42 outputs setting data DTC [4:0] as a correction signal SGC to the voltage generation circuit 99. The voltage generation circuit 99 generates a voltage corresponding to the setting data DTC [4:0] and outputs the voltage to the node NDC. The voltage generation circuit 99 is, for example, a D/A converter circuit that performs D/A conversion on the setting data DTC [4:0].

Figure 20:
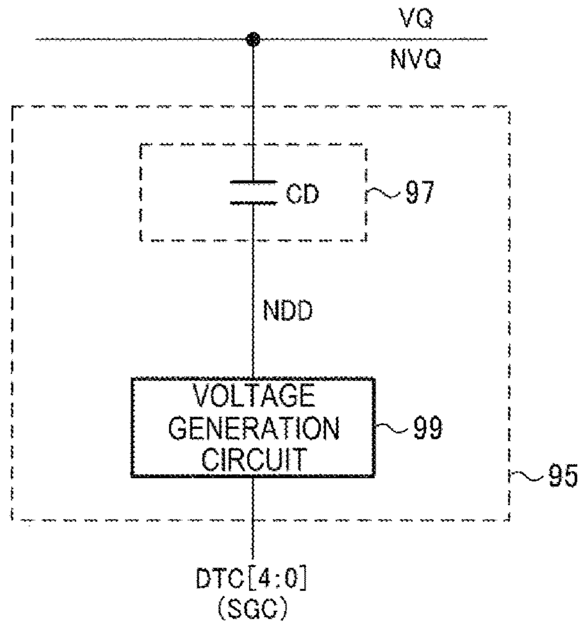
FIG. 20 illustrates a fourth detailed configuration example of the correction circuit.

FIG. 20 is a fourth detailed configuration example of the correction circuit. The correction circuit 95 includes a correction capacitor circuit 97 and a voltage generation circuit 99.

The correction capacitor circuit 97 includes a correction capacitors CD. One end of the correction capacitor CD is coupled to the output node NVQ, and the other end thereof is coupled to a node NDD. The voltage generation circuit 99 generates a voltage corresponding to the setting data DTC [4:0] and outputs the voltage to the node NDD. This configuration example is a configuration in which the voltage follower circuit 98 is omitted from the third detailed configuration example, and the output voltage VQ is corrected with a correction voltage corresponding to the setting data DTC [4:0] as in the third configuration example.

In the embodiment of FIG. 19, the correction capacitor circuit 97 includes the correction capacitor CC having one end coupled to the output node NVQ. The correction circuit 95 includes the voltage follower circuit 98. The correction signal SGC is input to the voltage follower circuit 98, and the voltage follower circuit 98 outputs a drive voltage to the other end of the correction capacitor CC.

In the embodiment of FIG. 20, the correction capacitor circuit 97 includes the correction capacitor CD. One end of the correction capacitor CD is coupled to the output node NVQ, and a drive voltage based on the correction signal SGC is input to the other end of the correction capacitor CD.

According to these embodiments, the other end of the correction capacitor CC is driven at the drive voltage corresponding to the setting data DTC [4:0] which is the correction signal SGC. As a result, the charges corresponding to the setting data DTC [4:0] are injected into the output node NVQ or discharged from the output node NVQ, and thus the output voltage VQ is corrected with the correction voltage corresponding to the setting data DTC [4:0].

5. Method for Determining Correction Data

Figure 21:
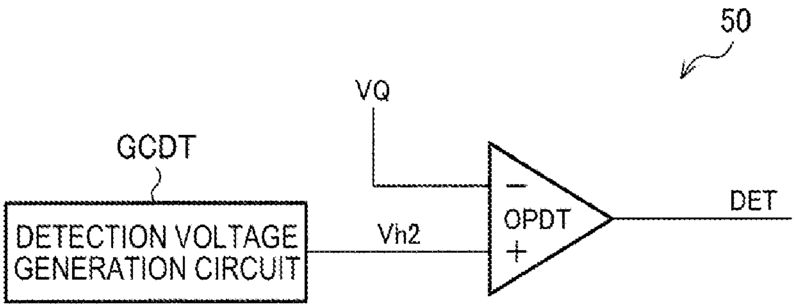
FIG. 21 illustrates a detailed configuration example of a detection circuit.

FIG. 21 is a detailed configuration example of the detection circuit. The detection circuit 50 includes a detection voltage generation circuit GCDT that generates a detection voltage Vh2 and a comparator OPDT that compares the voltage VQ of the output node NVQ with the detection voltage Vh2.

The detection voltage generation circuit GCDT generates the detection voltage Vh2 of the voltage set value set by the processing circuit 42. The detection voltage generation circuit GCDT is, for example, a D/A converter circuit that performs D/A conversion on a voltage set value. Alternatively, the detection voltage generation circuit GCDT may output the predetermined detection voltage Vh2 by using a voltage division circuit with a resistor element or the like.

Figure 22:
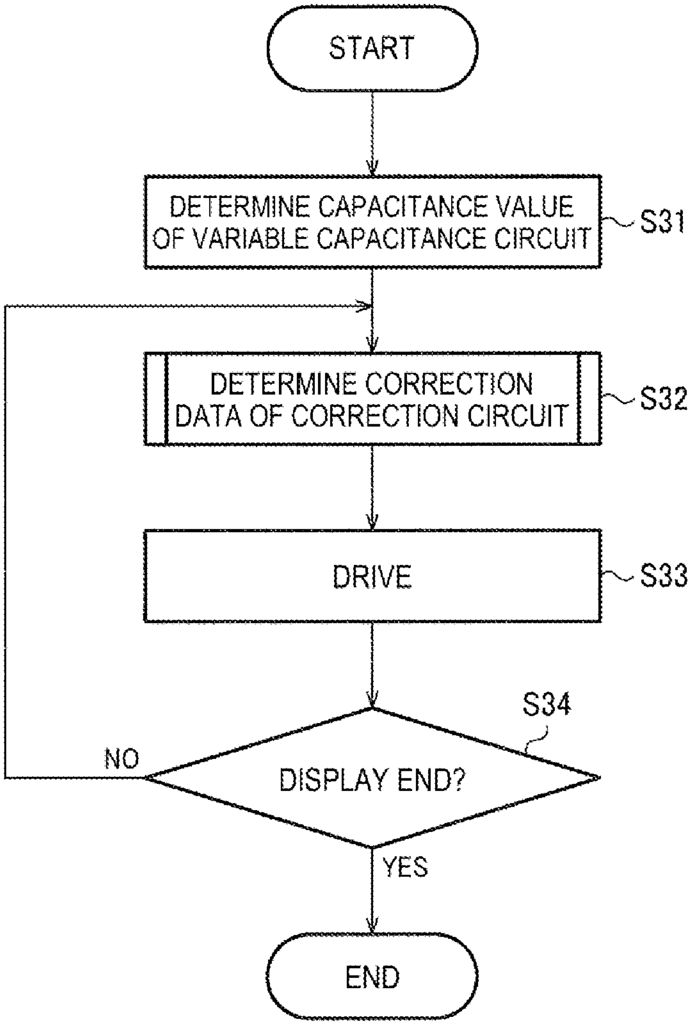
FIG. 22 illustrates a basic flowchart of correction data determination.

FIG. 22 is a basic flowchart of determination of correction data.

In step S31, the processing circuit 42 determines a capacitance value of the variable capacitance circuit 30. Step S31 is executed in an initialization process or the like of the driver 100. The determination method is as described in FIG. 2.

In step S32, the processing circuit 42 determines correction data of the correction circuit 95. Step S32 is executed, for example, in a blanking period of display. Step S32 of the first round may be executed in, for example, the initialization process of the driver 100. Details of this determination method will be described with reference to FIG. 23.

In step S33, the data-line drive circuit 110 performs driving.

In step S34, when the display does not end, the process returns to step S32, and when the display ends, the flow ends. Further, when only one operation of determining correction data is performed, step S34 may be omitted.

Figure 23:
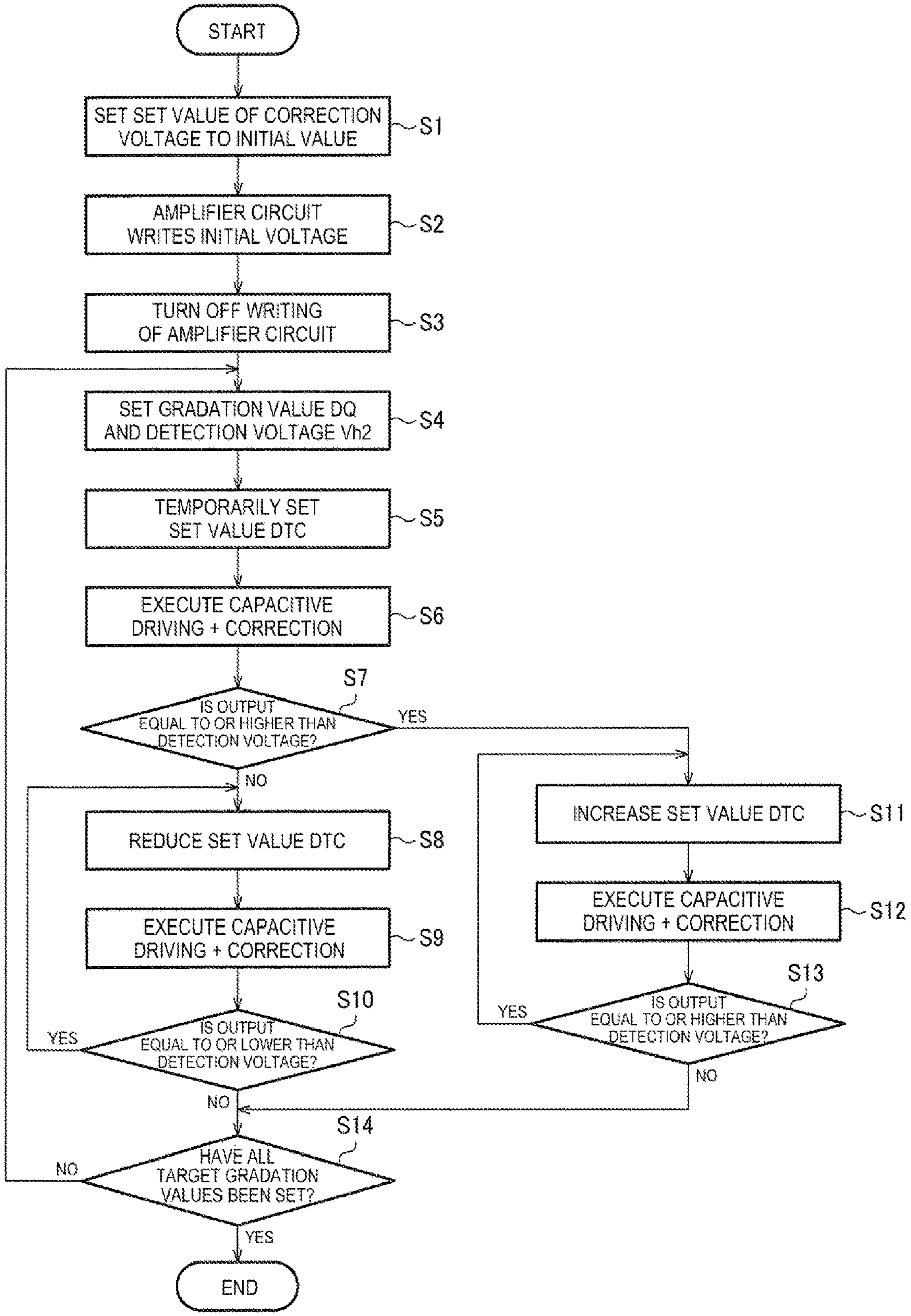
FIG. 23 illustrates a detailed flowchart of correction data determination.

FIG. 23 is a detailed flowchart of determination of correction data. This flow is executed in step S32 of FIG. 22. Hereinafter, a value of the setting data DTC [4:0] for setting a correction voltage will be denoted by a set value DTC.

In step S1, the processing circuit 42 sets the set value DTC as an initial value. Although the initial value is arbitrary, it may be, for example, a minimum value, a maximum value, or an intermediate value between the minimum value and the maximum value of DTC.

In step S2, the amplifier circuit 80 writes the initial voltage to the signal supply lines. The initial voltage is, for example, a precharge voltage VPR. In step S3, the amplifier circuit 80 turns off the writing of the initial voltage.

In step S4, the processing circuit 42 sets a gradation value DQ and a detection voltage Vh2 for capacitive driving. The detection voltage Vh2 is set to the same voltage as data voltage corresponding to the gradation value DQ.

In step S5, the processing circuit 42 temporarily sets the set value DTC. Although the temporary set value may be arbitrary, for example, a set value DTC corresponding to a correction voltage that is typically expected may be set.

In step S6, the capacitor circuit 10 and the capacitor drive circuit 20 perform capacitive driving, and the correction circuit 95 performs correction.

In step S7, the processing circuit 42 determines whether the output voltage VQ is equal to or higher than the detection voltage Vh2.

If the processing circuit 42 determines that the output voltage VQ is lower than the detection voltage Vh2 in step S7, the processing circuit 42 reduces the set value DTC in step S8. For example, the processing circuit 42 decrements the set value DTC.

In step S9, the capacitor circuit 10 and the capacitor drive circuit 20 perform capacitive driving, and the correction circuit 95 performs correction.

In step S10, the processing circuit 42 determines whether the output voltage VQ is lower than or equal to the detection voltage Vh2.

If the processing circuit 42 determines in step S10 that the output voltage VQ is lower than or equal to the detection voltage Vh2, the processing circuit 42 returns to step S8. If the processing circuit 42 determines in step S10 that the output voltage VQ is higher than the detection voltage Vh2, the processing circuit 42 proceeds to step S14. Thus, the set value DTC corresponding to the gradation value DQ set in step S4 is determined.

In step S14, the processing circuit 42 determines whether all target gradation values for which the set value DTC is to be determined have been set. The target gradation values are a plurality of predetermined gradation values among all gradation values. Further, when the number of target gradation values is one, step S14 may be omitted.

When the processing circuit 42 determines that all the target gradation values have been set in step S14, the processing circuit 42 ends the flow. When the processing circuit 42 determines in step S14 that there is a gradation value that has not been set among the target gradation values, the processing circuit 42 returns to step S4.

If the processing circuit 42 determines that the output voltage VQ is equal to or higher than the detection voltage Vh2 in step S7, the processing circuit 42 increases the set value DTC in step S11. For example, the processing circuit 42 increments the set value DTC.

In step S12, the capacitor circuit 10 and the capacitor drive circuit 20 perform capacitive driving, and the correction circuit 95 performs correction.

In step S13, the processing circuit 42 determines whether the output voltage VQ is equal to or higher than the detection voltage Vh2.

If the processing circuit 42 determines in step S13 that the output voltage VQ is equal to or higher than the detection voltage Vh2, the processing circuit 42 returns to step S11. If the processing circuit 42 determines in step S13 that the output voltage VQ is lower than the detection voltage Vh2, the processing circuit 42 proceeds to step S14. Thus, the set value DTC corresponding to the gradation value DQ set in step S4 is determined.

According to the above-described flow, set values DTC corresponding to a plurality of gradation values are determined and stored in the register circuit 48 as correction data. At the time of driving, when the input gradation value DQ does not correspond to any of the plurality of gradation values for which the correction data has been acquired, the processing circuit 42 performs interpolation processing based on the set values DTC corresponding to the plurality of gradation values, thereby obtaining the set value DTC for the input gradation value DQ.

FIG. 24 is an explanatory diagram of a method for determining a set value of a correction voltage for each factor of a voltage difference between an output voltage and a target voltage.

When the correction data for the voltage difference caused by the time constant of the capacitive driving is determined, the gradation value DQ of a target signal supply line for which the correction data is to be acquired is set in step S4. In steps S6, S9, and S12, the target signal supply line is capacitively driven.

When the correction data for the voltage differences caused by an error in a capacitance ratio in the capacitive driving is determined, gradation values DQ of all the signal supply lines are set, in step S4. In steps S6, S9, and S12, all of the target signal supply line are capacitively driven.

When correction data for the voltage difference caused by coupling of the signal supply lines is determined, a gradation value DQ of the target signal supply line and a gradation value DQ of the adjacent signal supply line are set, that is, the gradation difference between the target signal supply line and the adjacent signal supply line is set in step S4. In steps S6, S9, and S12, the target signal supply line and the adjacent signal supply line are capacitively driven.

In the present embodiment described above, the driver 100 includes the detection circuit 50 that detects the output voltage VQ of the output node NVQ. The processing circuit 42 determines the correction data based on the detection result from the detection circuit 50.

According to the present embodiment, when the detection circuit 50 detects the output voltage VQ of the output node NVQ, the processing circuit 42 can determine correction data for performing correction with an appropriate correction voltage corresponding to the voltage difference ΔV based on the detection result.

In the present embodiment, in the detection period other than the driving period of the signal supply lines, the detection circuit 50 detects the output voltage VQ of the output node NVQ, and the processing circuit 42 determines the correction data based on the detection result. In the driving period, the processing circuit 42 generates a correction signal SGC based on the correction data determined in the detection period.

According to the present embodiment, the correction data is determined in the detection period other than the driving period of the signal supply lines, and the output voltage VQ of the output node NVQ can be corrected by using the correction data in the driving period.

In addition, in this embodiment, the processing circuit 42 determines the correction voltage when the output voltage VQ of the output node NVQ becomes the target voltage while changing the correction voltage with respect to the gradation data DQ [10:0] in the detection period. The processing circuit 42 stores the correction data indicating the correspondence between the determined correction voltage and the gradation data DQ [10:0] in the storage circuit.

According to this embodiment, the correction voltage when the output voltage VQ of the output node NVQ becomes the target voltage is determined for each gradation value. Thus, the correction data for correcting the voltage difference ΔV which depends on the gradation values can be determined.

6. Electronic Apparatus

Figure 25:
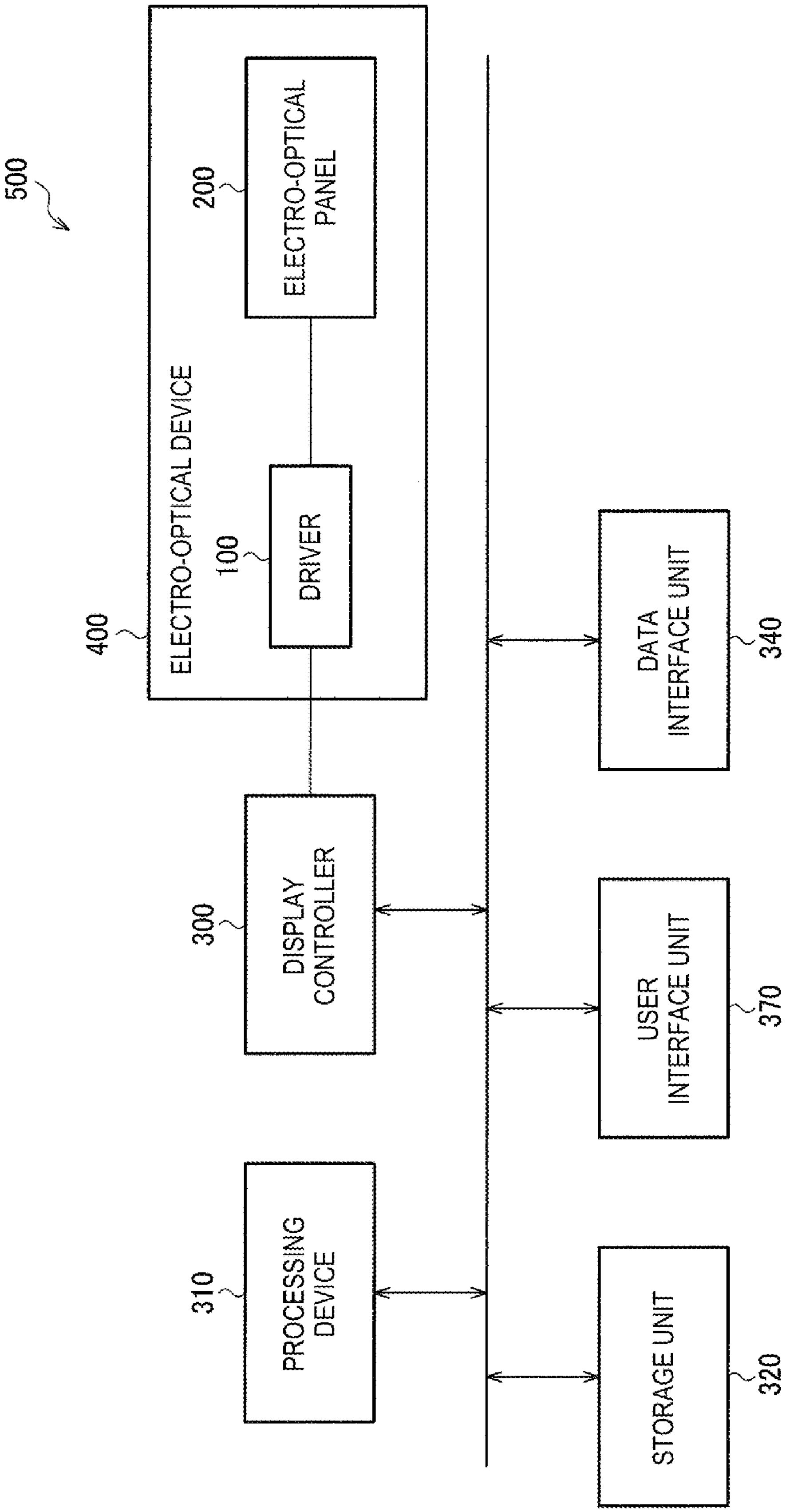
FIG. 25 illustrates a configuration example of an electronic apparatus.

FIG. 25 is a configuration example of an electronic apparatus including the driver of the embodiment. Various electronic apparatuses on which display devices are mounted can be contemplated as an electronic apparatus of the embodiment. Examples of the electronic apparatus include a projector, a television device, an information processing device, a mobile information terminal, a car navigation system, and a portable game terminal.

The electronic apparatus 500 includes an electro-optical device 400, a display controller 300, a processing device 310, a storage unit 320, a user interface unit 330, and a data interface unit 340. The electro-optical device 400 includes the driver 100 and the electro-optical panel 200.

The electro-optical panel 200 is, for example, a matrix-type liquid crystal display panel. Alternatively, the electro-optical panel 200 may be an electro-luminescence (EL) display panel using self-luminous elements. EL is an abbreviation for Electro-Luminescence. The user interface unit 330 is an interface unit for receiving various operations from a user. For example, the user interface is constituted by a button, a mouse, a keyboard, or a touch panel mounted to the electro-optical panel 200. The data interface unit 340 is an interface unit for inputting and outputting image data and control data. For example, the data interface unit 340 is a wired communication interface such as a USB or a wireless communication interface such as a wireless LAN. The storage unit 320 stores image data input from the data interface unit 340. Alternatively, the storage unit 320 functions as a working memory for the processing device 310 or the display controller 300. The processing device 310 performs control processing for each of the units of the electronic apparatus and various types of data processing. The processing device 310 is, for example, a processor, such as a CPU or a microcomputer. The display controller 300 performs control processing for the driver 100. For example, the display controller 300 converts image data transferred from the data interface unit 340 or the storage unit 320 into a format in which the driver 100 can receive the data, and outputs the converted image data to the driver 100. The driver 100 drives the electro-optical panel 200 based on the image data transferred from the display controller 300.

The driver of this embodiment described above includes a data voltage output terminal, a capacitor drive circuit, a capacitor circuit, a processing circuit, and a correction circuit. The data voltage output terminal is electrically coupled to signal supply lines of the electro-optical panel. The capacitor drive circuit outputs each of the first to n-th capacitor drive voltages corresponding to gradation data to a respective one of the first to n-th capacitor driving nodes, where n is an integer of two or more. The capacitor circuit includes first to n-th capacitors each provided between an output node that is a node of the data voltage output terminal and a respective one of the first to n-th capacitor driving nodes. The processing circuit generates a correction signal for correcting the voltage difference between an output voltage of the output node and a target voltage corresponding to gradation data. The correction circuit includes a correction capacitor circuit and corrects the voltage difference with a correction voltage corresponding to the voltage difference by injecting charges corresponding to the correction signal into the output node or discharging charges from the output node by using the correction capacitor circuit.

According to this embodiment, the correction circuit can correct the voltage difference between the output voltage of the output node and the target voltage by redistributing charges by using the correction capacitor circuit. As a result, even when the driving period is shorter than the time required for the voltage of the signal supply lines to reach the target voltage, the output voltage can be made to gradually approach the data voltage quickly.

Furthermore, in this embodiment, the driver may include a storage circuit that stores correction data indicating the correspondence between gradation data and correction voltages. Based on the correction data, the processing circuit may generate a correction signal for correcting the voltage difference with the correction voltage corresponding to the gradation data.

According to this embodiment, the correction data acquired in advance before driving is stored in the storage circuit, and the correction circuit can correct the voltage difference between the output voltage of the output node and the target voltage based on the correction data. As a result, the correction circuit can correct the voltage difference that depends on the gradation value of the gradation data based on the correction data.

In addition, in this embodiment, the correction capacitor circuit may include first to m-th correction capacitors each having one end coupled to the output node. The correction circuit may include first to m-th correction drive circuits that each output a respective one of first to m-th correction drive signals based on the correction signal to the other end of a respective one of the first to m-th correction capacitors.

According to this embodiment, the other ends of the first to m-th correction capacitors are driven due to the first to m-th correction drive signals based on the correction signal. As a result, charges corresponding to the correction signal are injected from the first to m-th correction capacitors to the output node or discharged from the output node, and thereby the output voltage of the output node is corrected.

In addition, in this embodiment, power supply voltages of the first to m-th correction drive circuits may be the same as the power supply voltage of the capacitor drive circuit.

According to this embodiment, a high correction voltage can be obtained or the capacitance value of the correction capacitor can be reduced, as compared with a case in which the power supply voltages of the first to m-th correction drive circuits are lower than the power supply voltage of the capacitor drive circuit.

In addition, in this embodiment, the power supply voltages of the first to m-th correction drive circuits may be lower than the power supply voltage of the capacitor drive circuit.

According to this embodiment, a micro correction voltage can be generated, as compared with a case in which the power supply voltages of the first to m-th correction drive circuits are the same as the power supply voltage of the capacitor drive circuit.

In addition, in this embodiment, the correction capacitor circuit includes first to m-th correction switches each having one end coupled to the output node, first to m-th correction capacitors each having one end coupled to the other end of a respective one of the first to m-th correction switches, and an (m+1)-th correction capacitor having one end coupled to the other ends of the first to m-th correction capacitors. The correction circuit may include a correction drive circuit that outputs a drive signal based on the correction signal to the other end of the (m+1)-th correction capacitor.

According to this embodiment, the capacitance value of the correction capacitor circuit is set by the correction signal, and the other end thereof is driven by the correction drive circuit. Thus, charges corresponding to the correction signal are injected into or discharged from the output node, and thereby the output voltage is corrected with the correction voltage corresponding to the correction signal.

In addition, in this embodiment, the correction capacitor circuit may include a correction capacitor having one end coupled to the output node. The correction circuit may include a voltage follower circuit to which the correction signal is input and that outputs a drive voltage to the other end of the correction capacitor.

In addition, in this embodiment, the correction capacitor circuit may include a correction capacitor having one end coupled to the output node and the other end to which the drive voltage based on the correction signal is input.

According to this embodiment, the other end of the correction capacitor is driven at the drive voltage corresponding to the correction signal. Thus, charges corresponding to the correction signal are injected into or discharged from the output node, and thereby the output voltage is corrected with the correction voltage corresponding to the correction signal.

In addition, in this embodiment, the driver may include a detection circuit that detects the output voltage of the output node. The processing circuit may determine correction data based on a detection result from the detection circuit.

According to this embodiment, when the detection circuit detects the output voltage of the output node, the processing circuit can determine correction data for performing correction with an appropriate correction voltage corresponding to the voltage difference based on the detection result.

In addition, in this embodiment, in the detection period other than the driving period of the signal supply lines, the detection circuit may detect the output voltage of the output node, and the processing circuit may determine the correction data based on the detection result. In the driving period, the processing circuit may generate a correction signal based on the correction data determined in the detection period.

According to this embodiment, the correction data can be determined in the detection period other than the driving period of the signal supply lines, and the output voltage of the output node can be corrected by using the correction data in the driving period.

Furthermore, in this embodiment, the processing circuit may determine the correction voltage when the output voltage of the output node becomes the target voltage while changing the correction voltage with respect to the gradation data in the detection period, and may cause the storage circuit to store the correction data indicating the correspondence between the determined correction voltage and the gradation data.

According to this embodiment, the correction voltage when the output voltage of the output node becomes the target voltage is determined for each gradation value. Thus, the correction data for correcting the voltage difference depending on the gradation values can be determined.

In addition, in this embodiment, the driver may include an amplifier circuit that outputs a data voltage corresponding to the gradation data to the output node.

According to this embodiment, since the correction circuit corrects the voltage difference between the output voltage of the output node and the target voltage, the voltage difference $\Delta V$ to be corrected by the amplifier circuit 80 is reduced. In addition, even when an error remains between a voltage finally written to a data line and the target voltage due to capacitive driving and correction, an accurate data voltage can be written to the data line by driving the amplifier circuit.

In addition, in this embodiment, the correction circuit may correct the voltage difference between the target voltage and the output voltage reached due to driving by the capacitor drive circuit and the capacitor circuit at the start timing of driving by the amplifier circuit.

According to this embodiment, the correction circuit corrects the voltage difference between the output voltage of the output node and the target voltage at the start timing of the amplifier driving. Thus, since the voltage difference to which the amplifier circuit should respond is reduced at the start timing of the amplifier driving, it is possible to reduce the power consumption or the size of the amplifier circuit, or it is possible to stabilize the output of the amplifier circuit.

In addition, in this embodiment, the correction circuit may start correction before the start timing of driving by the amplifier circuit.

According to this embodiment, since the correction is started before the start timing of the amplifier driving, the voltage difference at the start timing of the amplifier driving is corrected.

Furthermore, the electro-optical device according to this embodiment includes any driver described above and the electro-optical panel.

Further, the electronic apparatus according to this embodiment includes any driver described above.

Further, although this embodiment has been described in detail above, those skilled in the art will easily understand that many modified examples can be made without substantially departing from novel items and effects of the present disclosure. Therefore, such modified examples are intended to be included in the scope of the present disclosure. For example, terms in the specification or drawings given at least once along with different terms having identical or broader meanings can be replaced with different terms in all parts of the specification or drawings. In addition, all combinations of this embodiment and modified examples also fall within the scope of the present disclosure. In addition, configurations, operations, and the like of the control circuit, the data-line drive circuit, the driver, the electro-optical panel, the electro-optical device, and the electronic apparatus are not limited to those described in this embodiment, and various modifications can be achieved.

What is claimed is:

1. A driver comprising:

a data voltage output terminal electrically coupled to a signal supply line of an electro-optical panel;

a capacitor drive circuit configured to output each of first to n-th capacitor drive voltages corresponding to gradation data to a respective one of first to n-th capacitor driving nodes, n being an integer of two or more;

a capacitor circuit including first to n-th capacitors each provided between an output node and a respective one of the first to n-th capacitor driving nodes, the output node being a node of the data voltage output terminal;

a processing circuit configured to generate a correction signal for correcting a voltage difference between an output voltage of the output node and a target voltage corresponding to the gradation data; and a correction circuit including a correction capacitor circuit and configured to correct the voltage difference with a correction voltage corresponding to the voltage difference by injecting a charge corresponding to the correction signal into the output node or discharging the charge from the output node by using the correction capacitor circuit.

2. The driver according to claim 1, further comprising:

a storage circuit configured to store correction data indicating a correspondence between the gradation data and the correction voltage, wherein the processing circuit generates, based on the correction data, the correction signal for correcting the voltage difference with the correction voltage corresponding to the gradation data.

3. The driver according to claim 2, further comprising:

a detection circuit configured to detect the output voltage of the output node, wherein the processing circuit determines the correction data based on a detection result from the detection circuit.

4. The driver according to claim 3, wherein in a detection period other than a driving period of the signal supply line, the detection circuit detects the output voltage of the output node and the processing circuit determines the correction data based on the detection result and in the driving period, the processing circuit generates the correction signal based on the correction data determined in the detection period.

5. The driver according to claim 4, wherein the processing circuit determines the correction voltage when the output voltage of the output node becomes the target voltage while changing the correction voltage with respect to the gradation data in the detection period, and causes the storage circuit to store the correction data indicating a correspondence between the determined correction voltage and the gradation data.

6. The driver according to claim 1, wherein the correction capacitor circuit includes first to m-th correction capacitors each having one end coupled to the output node and the correction circuit includes first to m-th correction drive circuits each configured to output a respective one of first to m-th correction drive signals based on the correction signal to the other end of a respective one of the first to m-th correction capacitors.

7. The driver according to claim 6, wherein power supply voltages of the first to m-th correction drive circuits are the same as a power supply voltage of the capacitor drive circuit.

8. The driver according to claim 6, wherein power supply voltages of the first to m-th correction drive circuits are lower than a power supply voltage of the capacitor drive circuit.

9. The driver according to claim 1, wherein the correction capacitor circuit includes:

first to m-th correction switches each having one end coupled to the output node, first to m-th correction capacitors each having one end coupled to the other end of a respective one of the first to m-th correction switches, and an (m+1)-th correction capacitor having one end coupled to the other ends of the first to m-th correction capacitors and the correction circuit includes a correction drive circuit configured to output a drive signal based on the correction signal to the other end of the (m+1)-th correction capacitor.

10. The driver according to claim 1, wherein the correction capacitor circuit includes a correction capacitor having one end coupled to the output node and the correction circuit includes a voltage follower circuit to which the correction signal is input, the voltage follower circuit being configured to output a drive voltage to the other end of the correction capacitor.

11. The driver according to claim 1, wherein the correction capacitor circuit includes a correction capacitor having one end coupled to the output node and the other end to which a drive voltage based on the correction signal is input.

12. The driver according to claim 1, further comprising:

an amplifier circuit configured to output a data voltage corresponding to the gradation data to the output node.

13. The driver according to claim 12, wherein the correction circuit corrects the voltage difference between the target voltage and the output voltage reached due to driving by the capacitor drive circuit and the capacitor circuit at a start timing of driving by the amplifier circuit.

14. The driver according to claim 12, wherein the correction circuit starts correction before a start timing of driving by the amplifier circuit.

15. An electro-optical device comprising:

the driver according to claim 1; and the electro-optical panel according to claim 1.

16. An electronic apparatus comprising the driver according to claim 1.

* * * * *